(12) United States Patent
Nakamura et al.

(10) Patent No.: US 7,522,149 B2
(45) Date of Patent: Apr. 21, 2009

(54) DISPLAY DEVICE AND INFORMATION TERMINAL DEVICE

(75) Inventors: Takashi Nakamura, Kumagaya (JP); Masahiro Yoshida, Fukaya (JP); Hirotaka Hayashi, Fukaya (JP); Miyuki Ishikawa, Kumagaya (JP); Yasuharu Tanaka, Fukaya (JP)

(73) Assignee: Toshiba Matsushita Display Technology Co., Ltd., Tokyo-To (JP)

( * ) Notice: Subject to any disclaimer, the term of this patent is extended or adjusted under 35 U.S.C. 154(b) by 401 days.

(21) Appl. No.: 10/551,521

(22) PCT Filed: Mar. 29, 2004

(86) PCT No.: PCT/JP2004/004461

§ 371 (c)(1), (2), (4) Date: Sep. 30, 2005

(87) PCT Pub. No.: WO2004/088496

PCT Pub. Date: Oct. 14, 2004

(65) Prior Publication Data

US 2006/0192766 A1 Aug. 31, 2006

(30) Foreign Application Priority Data

Mar. 31, 2003 (JP) ............................ 2003-096479
Jan. 8, 2004 (JP) ............................ 2004-003066

(51) Int. Cl.
G09G 3/36 (2006.01)
G06F 3/042 (2006.01)

(52) U.S. Cl. ........................ 345/104; 345/84; 345/87; 345/173; 345/175; 345/179; 178/18.01; 178/18.03; 178/18.06; 178/18.07; 178/18.11

(58) Field of Classification Search .................. 345/55, 345/84, 87, 104, 156, 173, 174, 175, 179; 178/18.01, 18.03, 18.05, 18.06, 18.07, 18.11
See application file for complete search history.

(56) References Cited

U.S. PATENT DOCUMENTS 4,794,634 A * 12/1988 Torihata et al. .......... 379/93.19

(Continued)

FOREIGN PATENT DOCUMENTS

CN 466438 12/2001

(Continued)

*Primary Examiner*—My-Chau T Tran
(74) *Attorney, Agent, or Firm*—Oblon, Spivak, McClelland, Maier & Neustadt, P.C.

(57) ABSTRACT

A liquid crystal display apparatus according to the present invention includes a pixel array unit 1 having signal lines and scanning lines respectively arranged side by side, a signal line drive circuit 2 which drives the signal lines, a scanning line drive circuit 3 which drives the scanning lines, a signal processing output circuit 4 which serially outputs the picked-up image data supplied from the sensors, and a sync signal generation circuit 5. A black-white change obtained in the picked-up image data when a finger is brought close to or brought into contact with the pixel array unit 1 is detected, and the coordinate position of the finger is identified taking the ambient brightness into consideration. Regardless of whether the surroundings are bright or dark, therefore, the coordinate position can be detected with high precision. Furthermore, when conducting the coordinate detection, the picked-up image data corresponding to all pixels are not detected, but the picked-up image data are detected every a plurality of pixels in both the signal line direction and the scanning line direction. Therefore, the time taken to detect the coordinates can be shortened.

5 Claims, 28 Drawing Sheets

U.S. PATENT DOCUMENTS

| | | | |
|---|---|---|---|
| 5,631,666 A * | 5/1997 | Tagawa et al. | 345/104 |
| 5,739,804 A * | 4/1998 | Okumura et al. | 345/99 |
| 5,847,690 A * | 12/1998 | Boie et al. | 345/104 |
| 6,396,471 B1 * | 5/2002 | Hirakata | 345/104 |
| 6,844,868 B2 * | 1/2005 | Hirakata | 345/104 |

FOREIGN PATENT DOCUMENTS

| | | |
|---|---|---|
| JP | 60-251425 | 12/1985 |
| JP | 1-150192 | 6/1989 |
| JP | 4-242724 | 8/1992 |
| JP | 5-257606 | 10/1993 |
| JP | 8-106351 | 4/1996 |
| JP | 8-115167 | 5/1996 |
| JP | 8-272529 | 10/1996 |
| JP | 10-198515 | 7/1998 |
| JP | 11-57216 | 3/1999 |
| JP | 2000-305099 | 11/2000 |
| JP | 2000-347805 | 12/2000 |
| JP | 2001-51782 | 2/2001 |
| JP | 2002-278698 | 9/2002 |
| JP | 2004-045875 | 2/2004 |
| JP | 2004-045879 | 2/2004 |

* cited by examiner

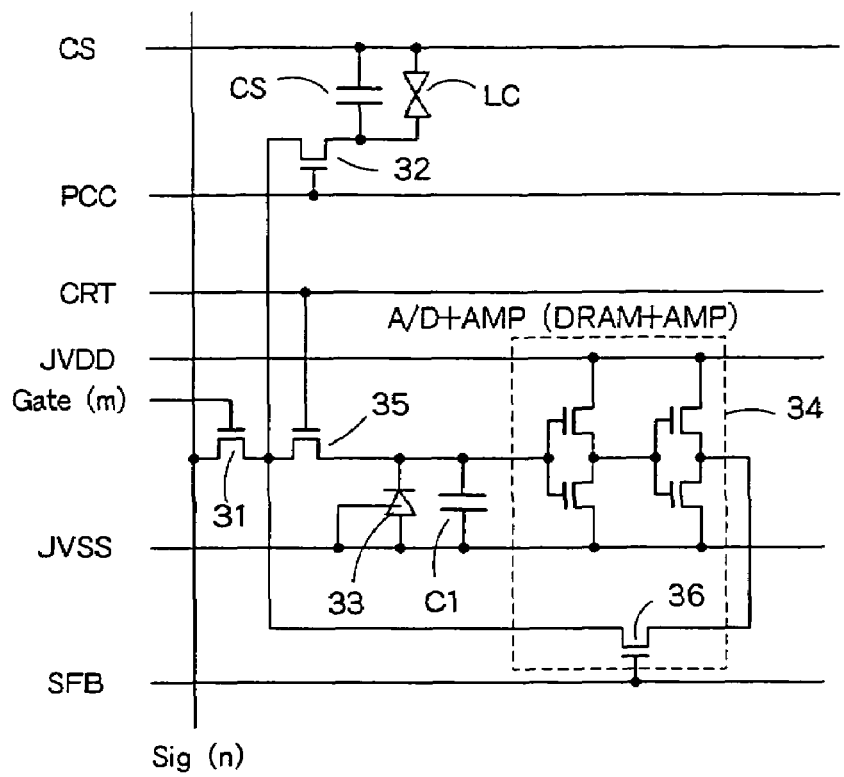
F I G. 2
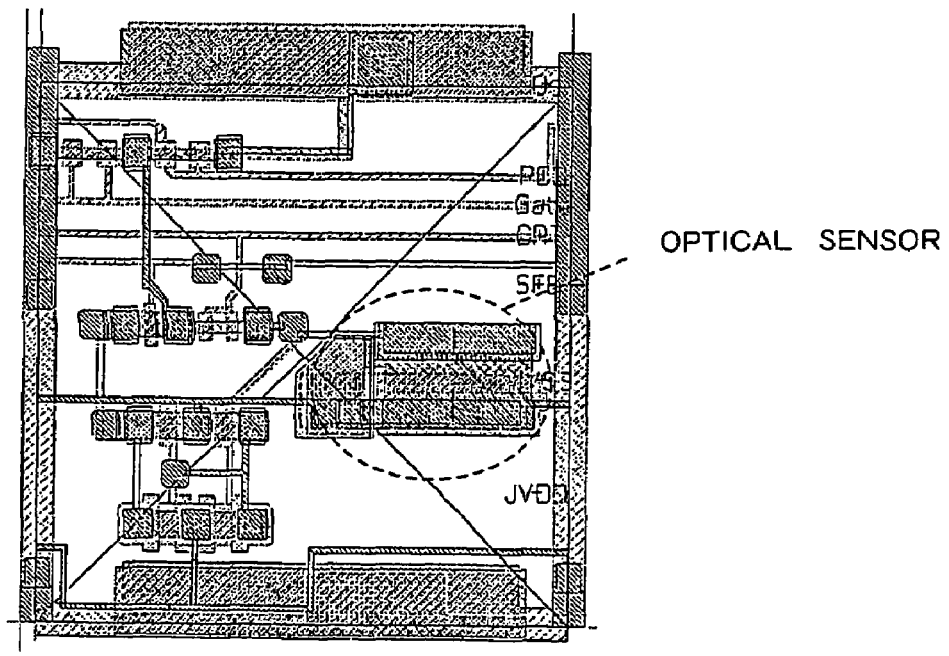
F I G. 3

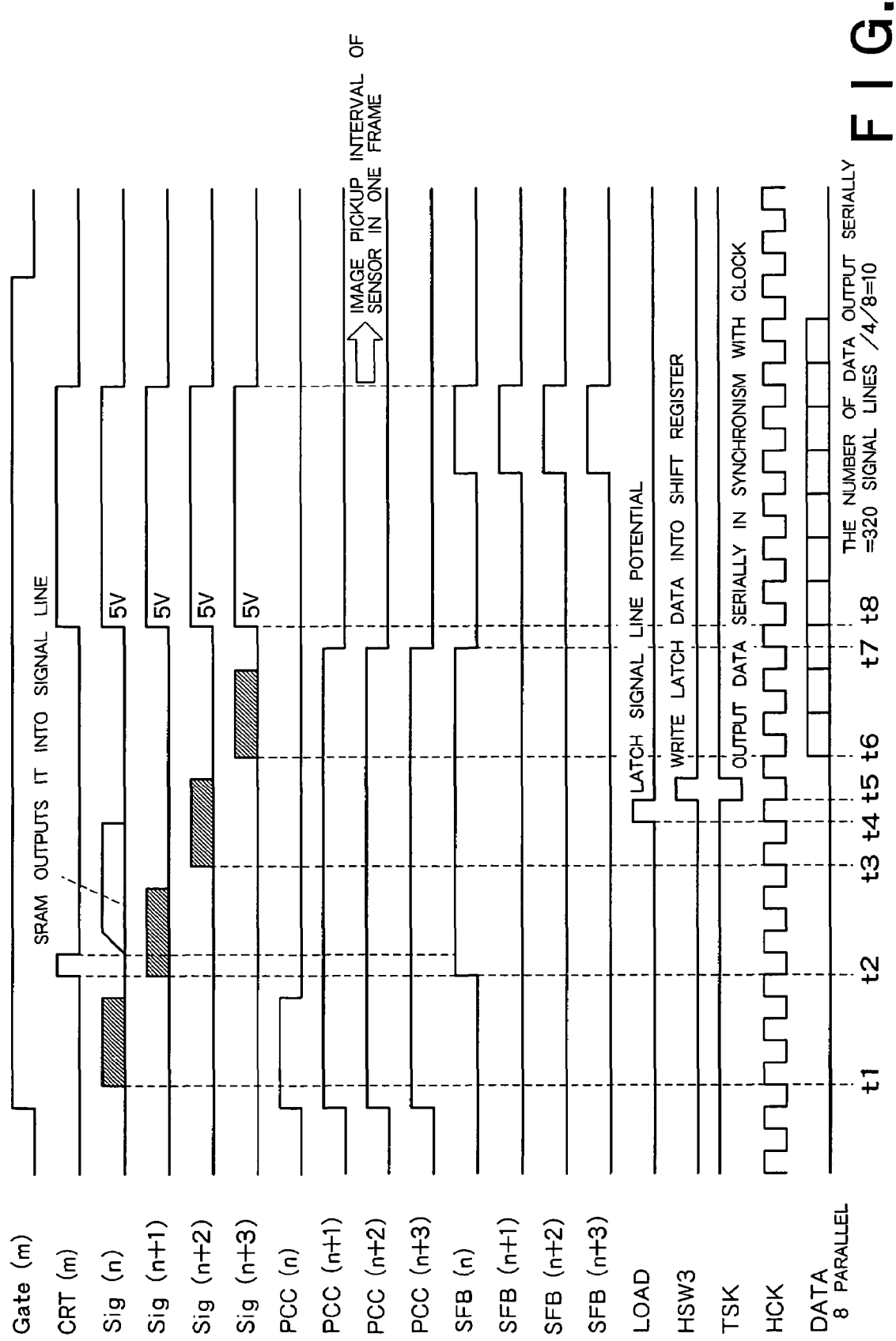

B/L LIT

B/L UNLIT

DIFFERENCE WITH B/L LIT

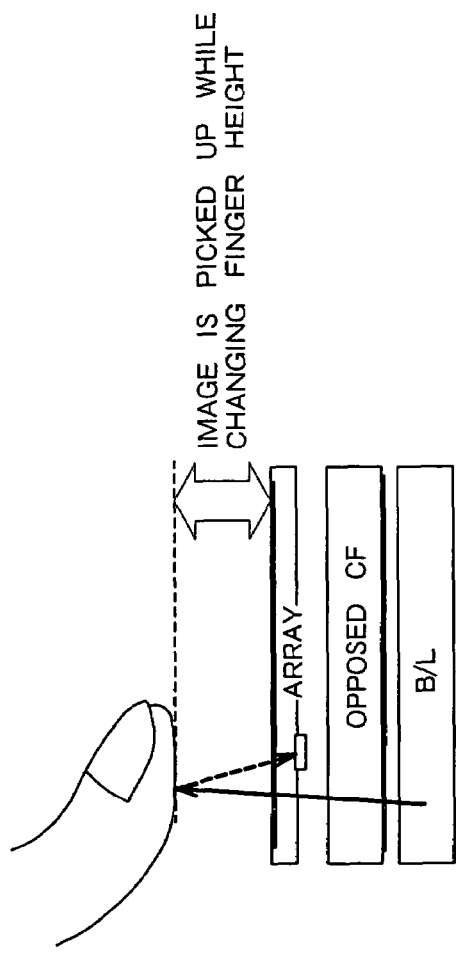
FIG. 14A
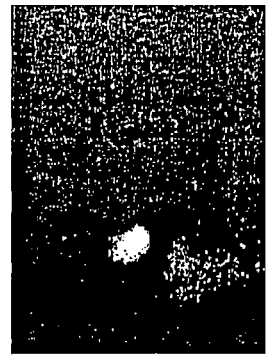
FIG. 14E
WITH HEIGHT OF 0mm (FIRM TOUCH)
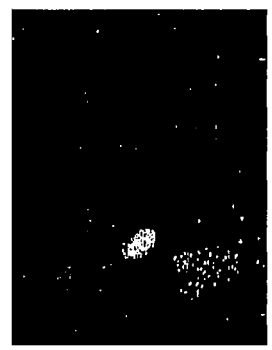
FIG. 14D
WITH HEIGHT OF 0mm (SLIGHT TOUCH)
FIG. 14C
WITH HEIGHT OF 2mm
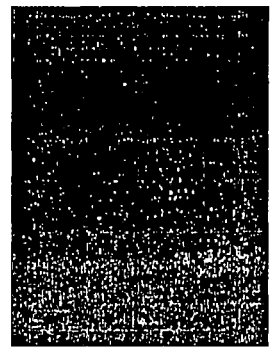
FIG. 14B
WITH HEIGHT OF 5mm
ENVIRONMENTAL ILLUMINANCE 20 lx

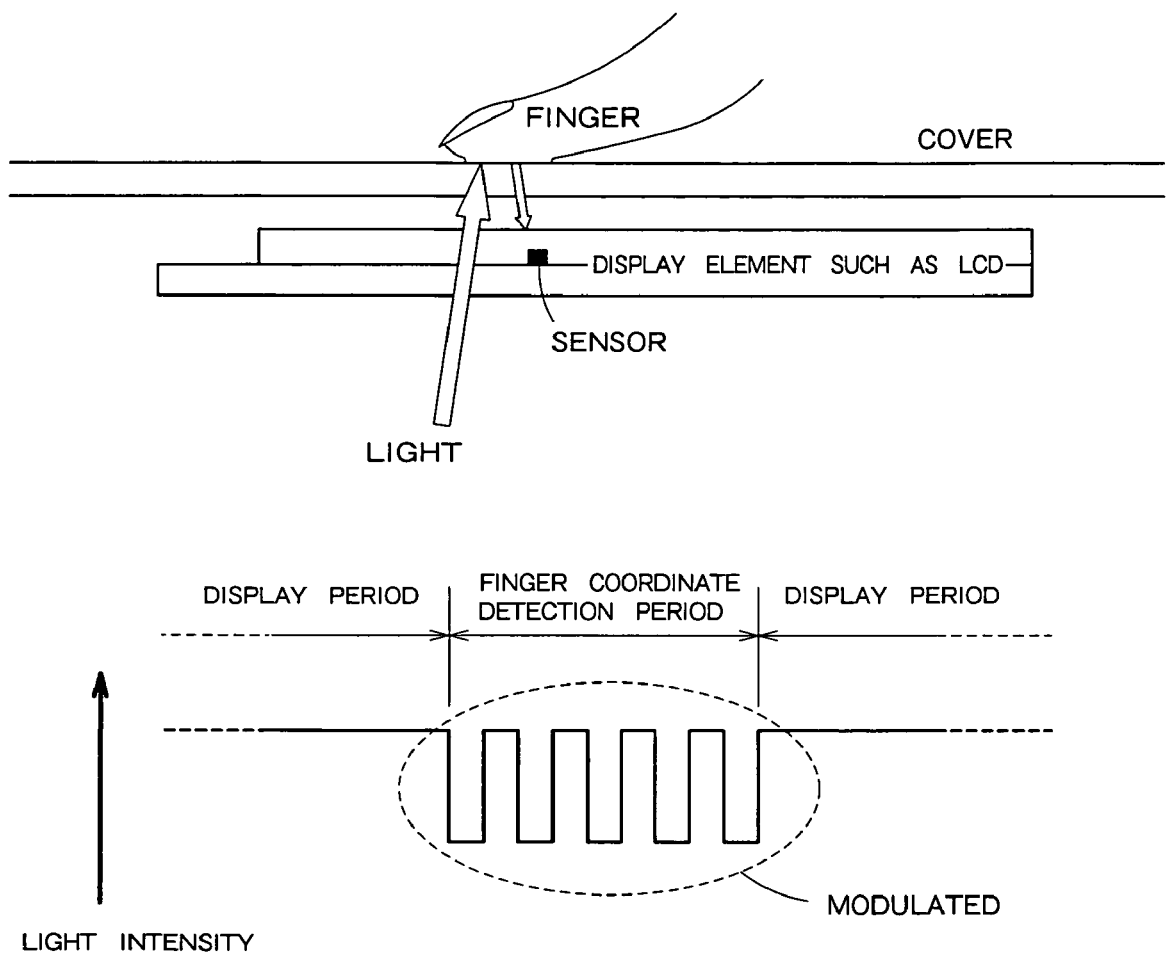
F I G. 18

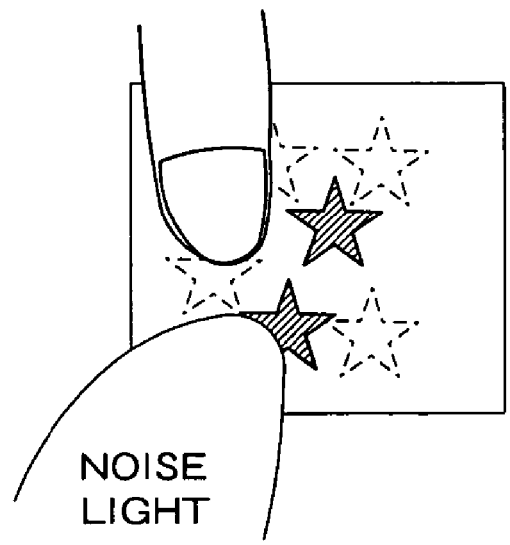
F I G. 22
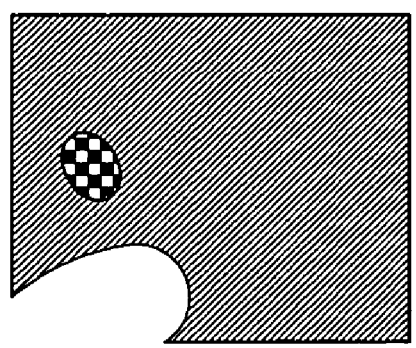
PORTION INCLUDING CHECKERED PATTERN IS FINGER
F I G. 23

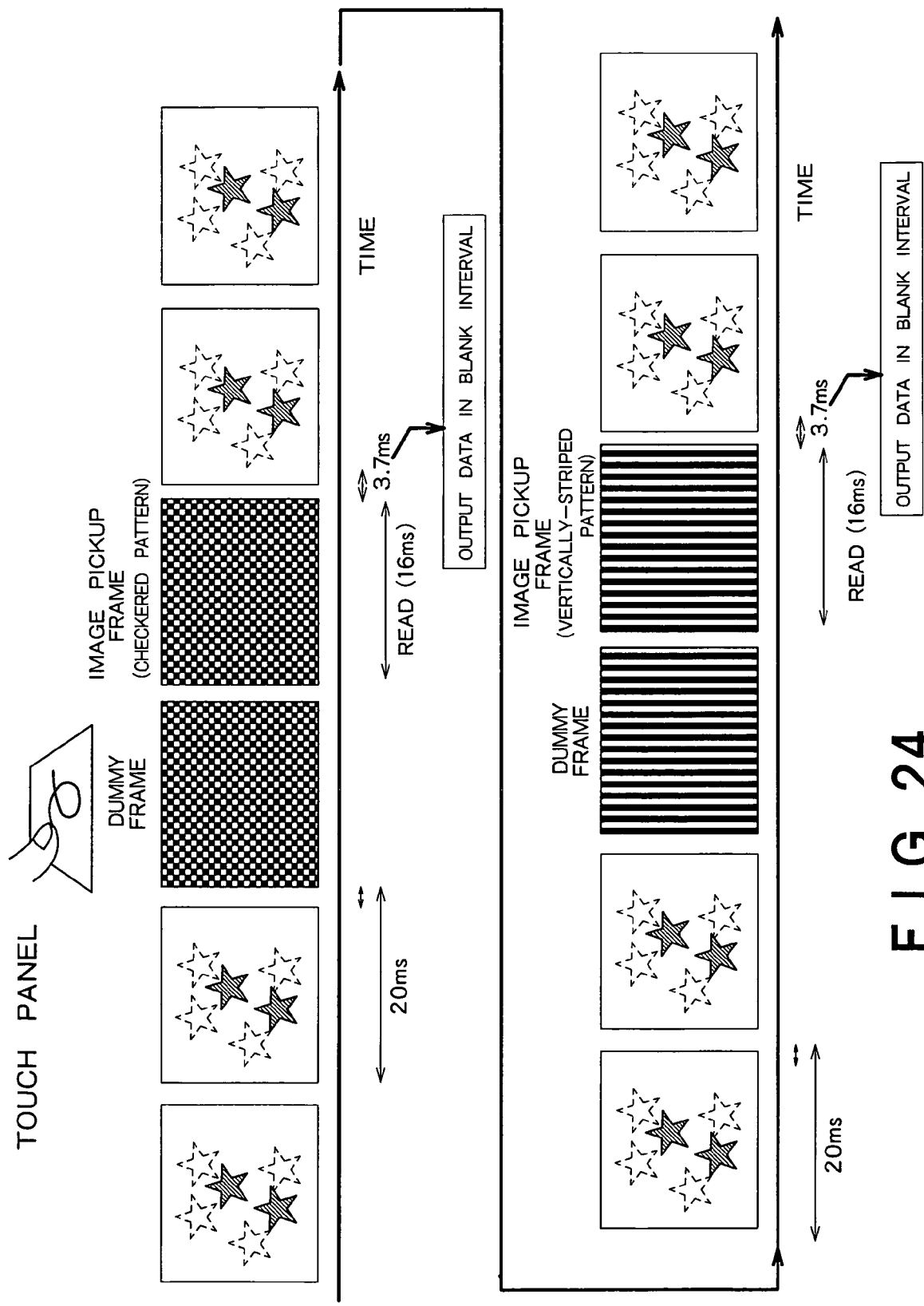
F I G. 24

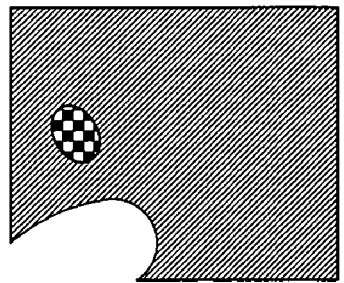
RESULT OF IMAGE PICKUP USING CHECKERED PATTERN
F I G. 25A
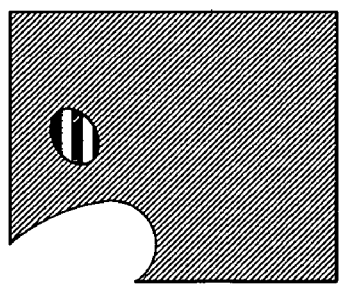
RESULT OF IMAGE PICKUP USING VERTICALLY-STRIPED PATTERN
F I G. 25B

RESULT OF IMAGE PICKUP USING
WHITE AND BLACK CHECKERED PATTERN

RESULT OF IMAGE PICKUP USING
RED AND BLACK CHECKERED PATTERN

F I G. 31
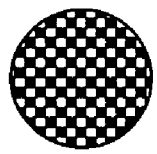
F I G. 32
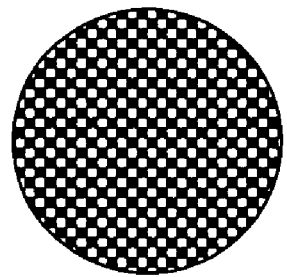
F I G. 33

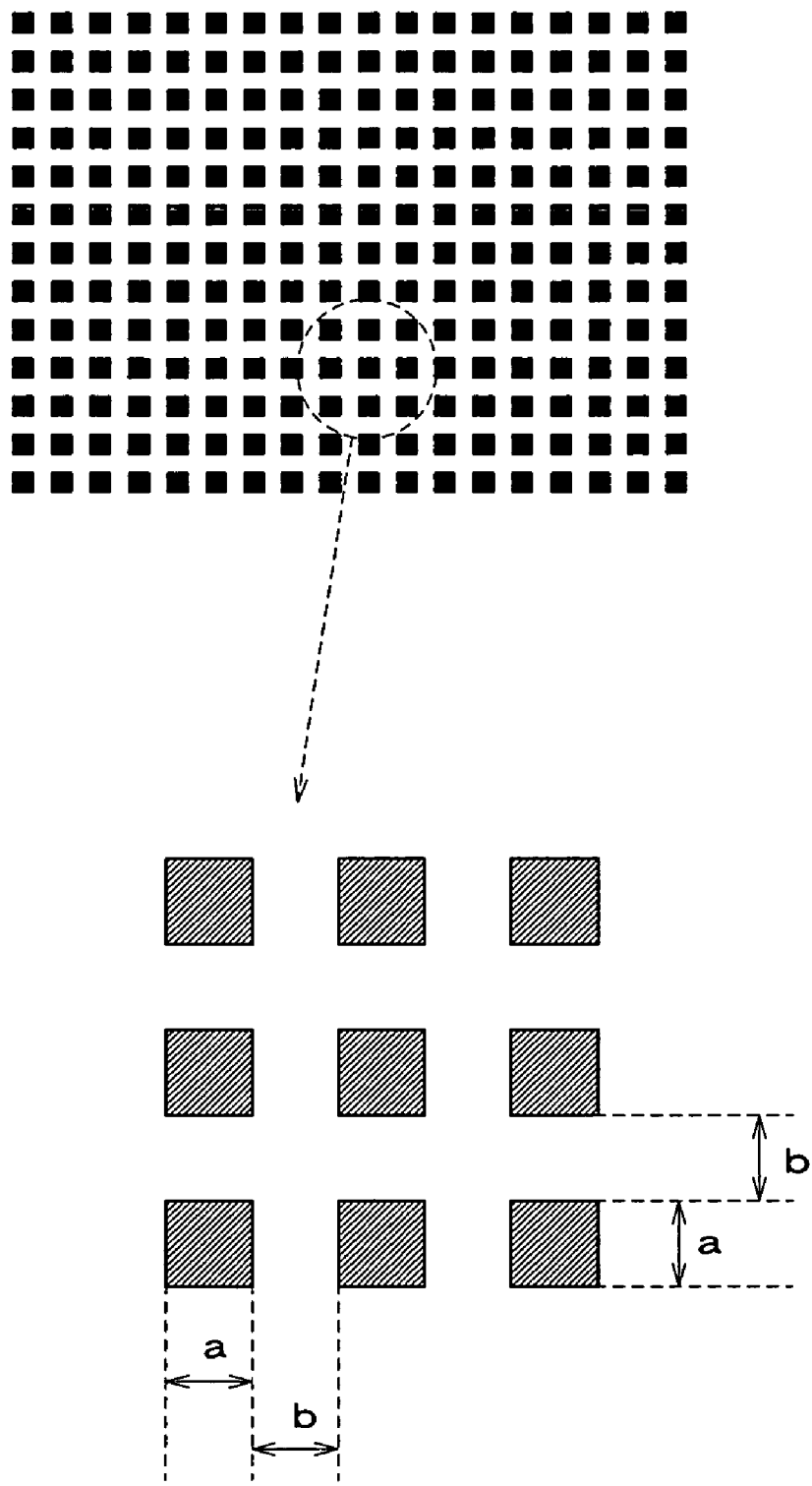
F I G. 34

DISPLAY DEVICE AND INFORMATION TERMINAL DEVICE

TECHNICAL FIELD

The present invention relates to a display apparatus and an information terminal apparatus having a function of taking in an image.

BACKGROUND ART

A technique of providing a display apparatus itself with a coordinate input function instead of providing a coordinate pointing member such as a mouse is proposed. For example, a configuration having a pressure sensitive touch panel disposed on a surface of the display apparatus, and a configuration having an electromagnetic induction tablet disposed on a back of the display apparatus are known. In the pressure sensitive touch panel, two transparent flat plates on which transparent electrode patterns made of a transparent electrode material are formed are opposed to each other with a predetermined clearance between them. Only in a portion pressed by a finger or the like, the electrode patterns are brought into contact with each other. As a result, resistance values in the electrode patterns are changed, and coordinates of the portion pressed by the finger or the like are calculated. As for the electromagnetic induction tablet, a predetermined electromagnetic wave is output from a dedicated tablet disposed on the back of the display apparatus. When a dedicated pen having a resonance circuit approaches the surface of the display apparatus, an electromagnetic wave emitted from the resonance circuit in the dedicated pen is received by the tablet and coordinates of the position of the dedicated pen are calculated by using a predetermined method. Both the pressure sensor touch panel and the electromagnetic induction tablet are used in portable personal computers and portable telephones (see Japanese Patent Application Laid-Open Publication Nos. 8-254682 and 7-225371).

However, the conventional display apparatus having the coordinate input function is difficult to reduce in size and often heavy in weight. Furthermore, as compared with the ordinary display apparatus, the conventional display apparatus having the coordinate input function is considerably high in cost and complicated in structure. Therefore, there is a problem, such as fragileness, in maintenance. Furthermore, it is strongly demanded that false operation is not caused by various kinds of noise.

DISCLOSURE OF THE INVENTION

In order to solve the above-described problems, the present invention has been achieved. An object of the present invention is to provide a display apparatus and an information terminal apparatus that can be reduced in size and price and that can detect coordinates with a high precision.

A display apparatus capable of detecting that a predetermined place of a display screen has been pointed by a human hand or a pointing member, the display apparatus comprising: display elements formed near intersections of signal lines and scanning lines respectively arranged in vertical and horizontal directions; image pickup units provided so as to be respectively associated with the display elements, which pick up incident light in a predetermined range in a state in which a predetermined display image is displayed on the display screen by the display elements; and a pointer detection portion which detects a portion having high correlation with a display image at image pickup time from the picked-up image, as a position pointed by a hand or a pointing member on the display screen.

A display apparatus capable of detecting that an arbitrary place of a display screen has been pointed by a human hand or a pointing member, the display apparatus comprising: display elements formed near intersections of signal lines and scanning lines respectively arranged in vertical and horizontal directions; image pickup units which pick up incident light in a predetermined range; D/A conversion circuits provided every a plurality of signal lines to supply pixel data for display to a plurality of signal lines associated therewith; amplifier circuits which output the picked-up image data in the image pickup units from pixels by using signal lines that are not supplied with pixel data, while the D/A conversion circuits supply pixel data to signal lines in order; and a pointer detection portion which detects a position pointed by a hand or a pointing member on the display screen, on the basis of the picked-up image data.

BRIEF DESCRIPTION OF THE DRAWINGS

FIG. 2 is a detailed circuit diagram corresponding to one pixel in a pixel array unit 1;

FIG. 3 is a layout diagram corresponding to one pixel on a glass substrate;

FIG. 7 is a detailed timing diagram corresponding to FIG. 6;

FIGS. 14A to 14E are diagrams showing how an image picked up changes according to a distance between a finger and a pixel array unit 1;

FIG. 17 is a diagram showing attachment of a soft pointing member to a strap attached to a portable telephone or the like;

FIG. 18 is an operation timing diagram showing an example in which a finger coordinate detection period is provided in an interval between display frame periods;

FIG. 22 is a diagram showing an incidence situation of noise light;

FIG. 23 is a diagram showing an image picked up by using a pattern shown in FIG. 21;

FIG. 24 is a diagram showing an example in which image pickup is conducted using a plurality of special patterns;

FIGS. 25A and 25B are diagrams showing picked-up images obtained by picking up images using the special patterns shown in FIG. 24;

FIG. 31 is a diagram showing an example in which a pointing member has a special pattern on its surface;

FIG. 32 is a diagram showing the area of contact obtained before contact;

FIG. 33 is a diagram showing the area of contact obtained after contact;

FIG. 34 is a diagram showing a lattice pattern in an image pickup frame; and

BEST MODE FOR CARRYING OUT THE INVENTION

Hereafter, a display apparatus and an information terminal apparatus according to the present invention will be described more specifically with reference to the drawings. Hereafter, a liquid crystal display apparatus will be described as an example of a display apparatus and an information terminal apparatus according to the present invention.

FIRST EMBODIMENT

In a liquid crystal display apparatus according to a first embodiment, a sensor which takes in an image is disposed for each pixel. A substrate having a common electrode formed of a transparent electrode material such as ITO is disposed so as to be opposed to an LCD substrate with a predetermined clearance (approximately 5 microns). A liquid crystal material is injected between the LCD substrate and the opposed substrate, and they are sealed by a predetermined method. In addition, sheet polarizers are stuck on outsides of both substrates and used.

Figure 1:
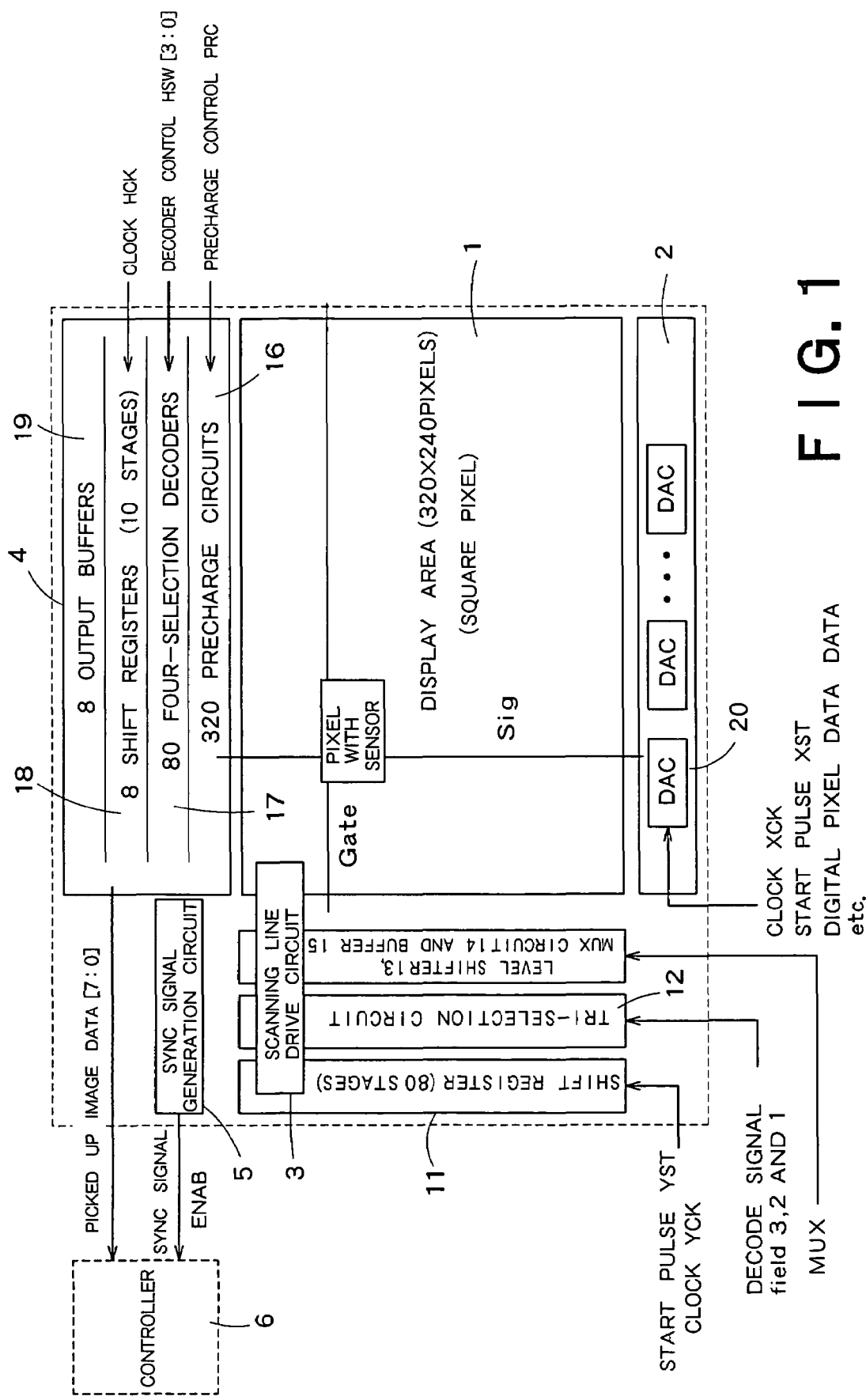
FIG. 1 is a block diagram showing a schematic configuration of an embodiment of a liquid crystal display apparatus.

FIG. 1 is a block diagram showing a schematic configuration of a liquid crystal display apparatus according to one embodiment. The liquid crystal display apparatus shown in FIG. 1 includes a pixel array unit 1 having signal lines and scanning lines arranged in a matrix form, a signal line drive circuit 2 which drives the signal lines, a scanning line drive circuit 3 which drives the scanning lines, a signal processing output circuit 4 which serially outputs the picked-up image data supplied from the sensors, a sync signal generation circuit 5, and a controller 6 which receives digital pixel data from a CPU, supplies the digital pixel data to the signal line drive circuit at predetermined timing, and conducts processing on the picked-up image data.

The pixel array unit 1 is formed on the LCD substrate by using low temperature polysilicon TFT (Thin Film Transistor). Furthermore, at least a part of the signal line drive circuit 2, the scanning line drive circuit 3, the signal processing output circuit 4 and the sync signal generation circuit 5 is also formed on the LCD substrate by using low temperature polysilicon TFT. The controller 6 may be formed or mounted on the LCD substrate, or may be mounted on another substrate.

The pixel array unit 1 has a display resolution of 320 pixels in the horizontal direction by 240 pixels in the vertical direction. The total number of the signal lines is 320, and the total number of scanning lines is 240. Each pixel has the shape of a square, and each pixel does not have a color filter. A back light not shown, which is disposed on the back of the LCD substrate, includes at least LEDs which emit red, green and blue light.

Display color of liquid crystal can be varied with 64 gradation levels from white to black on the basis of a voltage written into an auxiliary capacitance Cs. In synchronism with it, the back light is turned on with a color of red, green or blue. As a result, display having 64 gradation levels for each color, i.e., the so-called field sequential drive is conducted.

In the signal line drive circuit 2, 80 DACs 20 in total are provided at the rate of one every four signal lines. In the display period, each horizontal interval is divided into four sub-periods. Four signal lines are regarded as one set. The signal line drive circuit 2 drives one signal line in each set in each sub-period. The signal line drive circuit 2 converts digital pixel data input from an external IC at predetermined periods to an analog pixel voltage suitable for liquid crystal driving, and drives the four signal lines in order.

The scanning line drive circuit 3 includes an 80-stage shift register 11, a tri-selection circuit 12, a level shifter 13, a multiplexer (MUX circuit) 14, and a buffer 15.

The tri-selection circuit 12 selects one from among three adjacent scanning lines. Therefore, the tri-selection circuit 12 can drive 240 scanning lines every three scanning lines. By using such a scanning line drive method, the average gradation level (the ratio of the number of white pixels to the number of unit pixels) of the whole screen can be detected in a short time. In other words, the scanning lines are driven every three scanning lines, results of image pickup conducted by sensors associated with the scanning lines are read out to calculate an average gradation level. On the basis of a result of the calculation, it is determined whether to read out results of image pickup conducted by remaining sensors or whether to change image pickup conditions and conduct the image pickup again. Therefore, image data picked up under unsuitable image pickup conditions can be prevented from being taken in wastefully. As a result, the time taken until the image pickup result is finally displayed can be shortened, and power dissipation required to output the image pickup data can be reduced.

The signal processing output circuit 4 includes precharge circuits 16, four-selection decoders 17 each of which selects one from among four signal line outputs, shift registers 18 each of which shifts outputs of the four-selection decoder 17, and output buffers 19 connected to outputs of the shift registers 18. Each of the output buffers 19 includes a plurality of inverters connected in cascade. The inverters are gradually expanded in channel width according to the output load. In synchronism with a shift clock, the output buffers 19 amplify and output the picked-up image data that successively appear at predetermined nodes in the shift registers 18.

FIG. 2 is a detailed circuit diagram corresponding to one pixel in the pixel array unit 1. FIG. 3 is a layout diagram corresponding to one pixel on the glass substrate. As shown in FIG. 2, each pixel includes a pixel TFT 31, a display control TFT 32 which controls whether to store electric charge in the auxiliary capacitance Cs, an image take-in sensor 33 which picks up an image of incidence light in a predetermined range, a capacitor C1 (hereafter also referred to as sensor capacitance) which stores the images picked up by the sensor 33, an SRAM 34 which stores binary data depending upon the electric charge stored on the capacitor C1, and an initialization TFT 35 which stores an initial electric charge in the capacitor C1. The SRAM 34 includes two inverters connected in cascade. It is possible to express a potential at the capacitor C1 as binary data. When the TFT 35 and a TFT 36 have turned on simultaneously, these inverters are connected in a loop form, and can hold the binary data.

Here, the luminance of each pixel is controlled in gradation by controlling the transmittance of a liquid crystal layer interposed between the LCD substrate and the opposed substrate on the basis of a difference between a pixel electrode potential depending upon the charge stored in the auxiliary capacitance Cs and a potential at the common electrode formed on the opposed substrate.

In FIG. 2, an example in which one sensor 33 is provided for each pixel is shown. However, the number of the sensors is not especially restricted. As the number of the sensors 33 per pixel is increased, the resolution of taking in the image can be improved.

When initializing the capacitor C1, the pixel TFT 31 and the initialization TFT 35 are turned on. When writing an analog pixel voltage (analog pixel data) for setting the luminance of a display element in the auxiliary capacitance Cs, the pixel TFT 31 and the display control TFT 32 are turned on. When holding (refreshing) data in the SRAM 34, both the initialization TFT 35 and the data retaining TFT 36 in the SRAM 34 are turned on. When supplying the picked-up image data stored in the SRAM 34 to a signal line, both the pixel TFT 31 and the data retaining TFT 36 are turned on.

The display apparatus according to the present embodiment can conduct the ordinary display operation, and can take in an image as well in the same way as the scanner. In addition, the display apparatus according to the present embodiment can read a shadow of a user's finger caused by its approach, light reflected by the bulb of the finger, or a bright portion or a projected pattern caused by approach of an optical pen, and use a result of reading in detection of pointed coordinates. When conducting the ordinary display operation, the TFTs 35 and 36 are set to the off-state and valid data is not stored in the SRAM 34. In this case, signal lines are supplied with signal line voltages from the signal line drive circuit 2, and display according to the signal line voltages is conducted.

Figure 4:
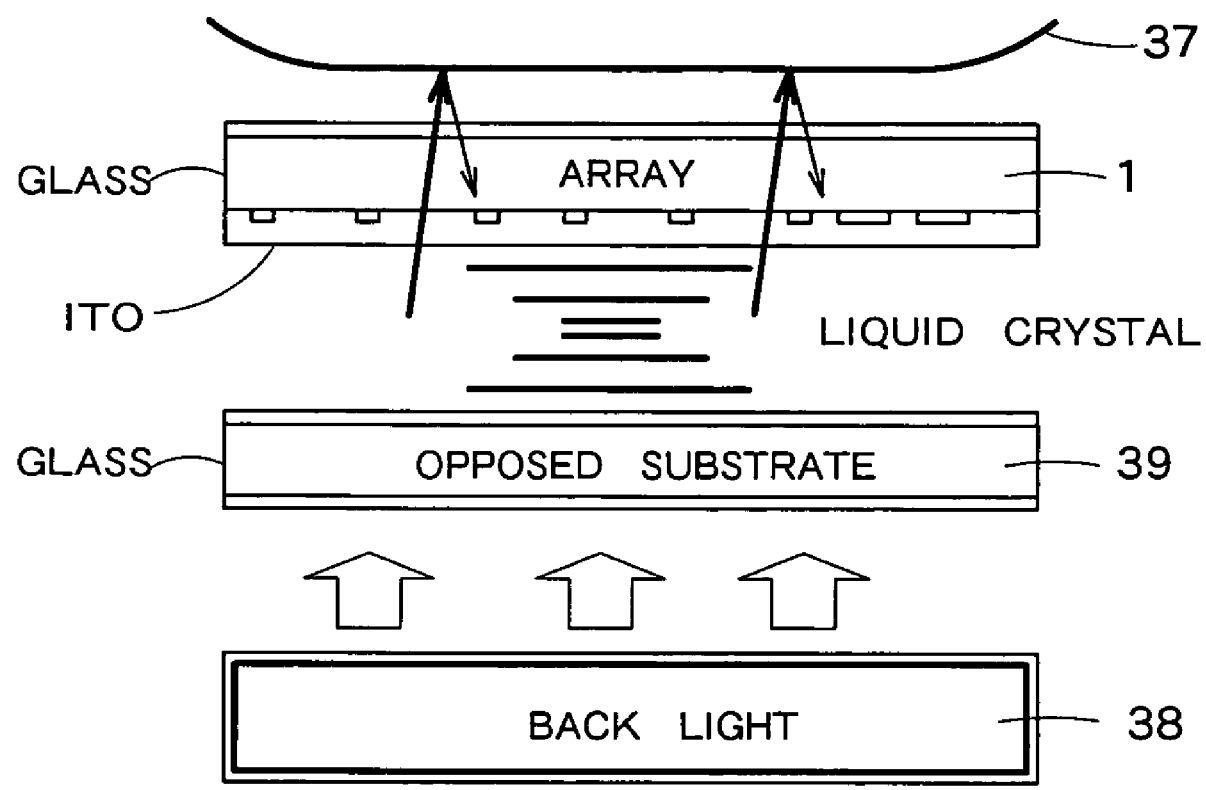
FIG. 4 is a diagram showing a method for taking in an image.

On the other hand, when taking in an image, a subject of image take-in (such as a paper surface) 37 is disposed on the top face of the LCD substrate 1 as shown in FIG. 4. Light from a back light 38 is applied to the paper surface 37 via an opposed substrate 39 and the LCD substrate 1. Light reflected by the paper surface 37 is received by the sensor 33 on the LCD substrate 1 to take in an image.

It is desirable that the glass substrate and the sheet polarizer disposed at the side of the image pickup subject are thin as far as possible. It is desirable that the shortest distance between the sensor and the image pickup subject (i.e., the sum total of the thickness of the sensor substrate and the thickness of the sheet polarizer such as an optical film attached on the sensor substrate) is 0.3 mm or less. It is more desirable that the sum total is approximately 0.2 mm or less. In many cases, the paper surface is typically a diffuse reflection surface, and it diffuses the applied light strongly. If the glass substrate on the image pickup side is thick, the distance between a light sensing portion in the sensor and the paper surface is increased and diffused and reflected light becomes apt to enter sensors of adjacent pixels and the image taken in often gets blurred. That is the reason why it is more desirable that the sum total is approximately 0.2 mm or less. Furthermore, it is desirable to dispose the array substrate 1 at the front side as shown in FIG. 4. If the array substrate 1 incorporating the sensors is disposed at the rear side (back light side), light reflected by the finger passes through the liquid crystal layer and arrives at the sensor, resulting in a decreased quantity of light. That is the reason why it is desirable to dispose the array substrate 1 at the front side.

The image data taken in is stored in the SRAM 34 shown in FIG. 2, and then sent to an LCDC not shown via a signal line. This LCDC receives a digital signal output from the display apparatus according to the present embodiment, and conducts data rearrangement and arithmetic operation such as removal of noise contained in the data.

When detecting coordinates of a subject that is comparatively large, such as a human finger, as compared with the pixel pitch (approximately several hundred microns), it is not always necessary to take in an image with a high resolution. In the present embodiment, therefore, an image is taken in every four signal lines in a row (horizontal) direction whereas an image is taken in every three scanning lines in a column (vertical) direction.

Figure 5:
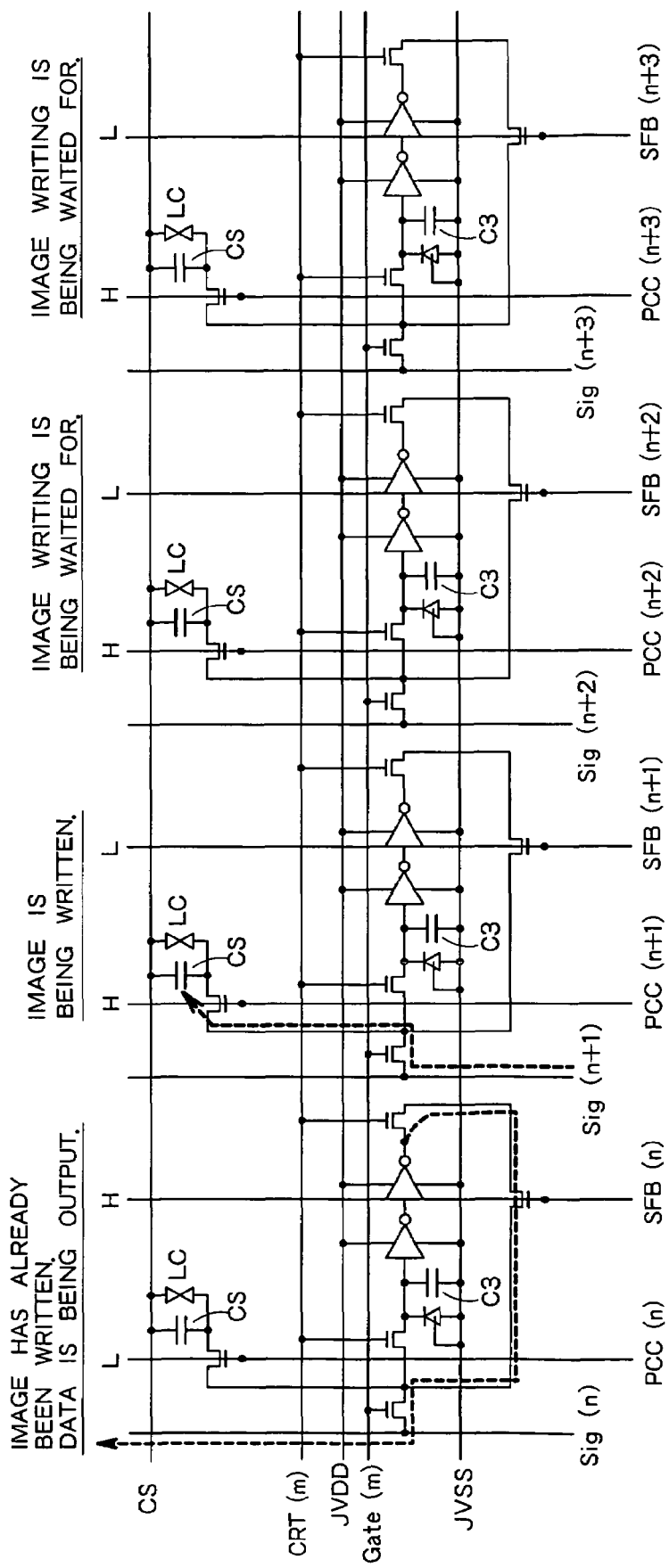
FIG. 5 is an equivalent circuit diagram of four pixels arranged so as to be adjacent to each other in the horizontal direction.

FIG. 5 is an equivalent circuit diagram of four pixels (a pixel n, a pixel (n+1), a pixel (n+2) and a pixel (n+3)) arranged so as to be adjacent to each other in the horizontal direction. This circuit has a feature that among control lines a Gate line and CRT can be driven every row, and SFB and PCC can be driven every column. Furthermore, a gate TFT is provided in an output portion of the SRAM. The four pixels shown in FIG. 5 are supplied with the analog pixel voltage from the same DAC 20. The picked-up image data of only one pixel (the leftmost pixel) among the four pixels shown in FIG. 5 is output from the signal processing output circuit 4. In other words, only the pixel n among the four pixels outputs the picked-up image data. Although the picked-up image data of other pixels may also be output, time is wasted excessively that much. Furthermore, which pixel among the four pixels writes the analog pixel voltage and which pixel outputs the picked-up image data is not limited. The order may be changed suitably every row. There is no great difference in calculating the coordinates pointed by an object, such as a light pen or a finger that is greater than the pixel pitch. In the present example, sensor data is output from a pixel in which the writing of the analog pixel voltage has been completed. Conversely, however, it is also possible to output data from a sensor earlier and then write an analog pixel voltage into the sensor. In this way, various variations are possible. In a configuration in which the horizontal interval is divided into a plurality of periods and one DAC drives signal lines in order, the period over which an individual signal line is occupied for the display is short and the time over which nothing is written is long. The idea is to use this long time to output data from the sensor.

Hereafter, operation conducted while digital pixel data is being written into the pixel (n+1) after digital pixel data has been written into the pixel n among the four pixels shown in FIG. 5 will be described. In this case, in the pixel n, a signal PCC(n) shown in FIG. 2 is caused to go low and a signal SFB(n) is caused to go high. While retaining the potential at the auxiliary capacitance Cs, digital pixel data from the SRAM 34 is written in the signal line n.

In the pixel n, therefore, the picked-up image data retained by the SRAM 34 is output from the SRAM 34 to the signal line n via the data retaining TFT 36 without conducting writing into the auxiliary capacitance Cs.

In the pixel (n+1), a signal PCC(n+1) is caused to go high and a signal SFB(n+1) is caused to go low. Digital pixel data on a signal line (n+1) is written into the auxiliary capacitance Cs. In the pixel (n+1), therefore, the picked-up image data is not output from the SRAM 34 into the signal line (n+1), but a signal line voltage driven by the DAC 20 is taken in the auxiliary capacitance Cs.

In the pixel (n+2), a signal PCC (n+2) is caused to go high and a signal SFB (n+2) is caused to go low. In this state, writing from a signal line (n+2) into the auxiliary capacitance Cs is waited for. In the pixel (n+3), a signal PCC (n+3) is caused to go high and a signal SFB (n+3) is caused to go low. In this state, writing from a signal line (n+3) into the auxiliary capacitance Cs is waited for.

Figure 6:
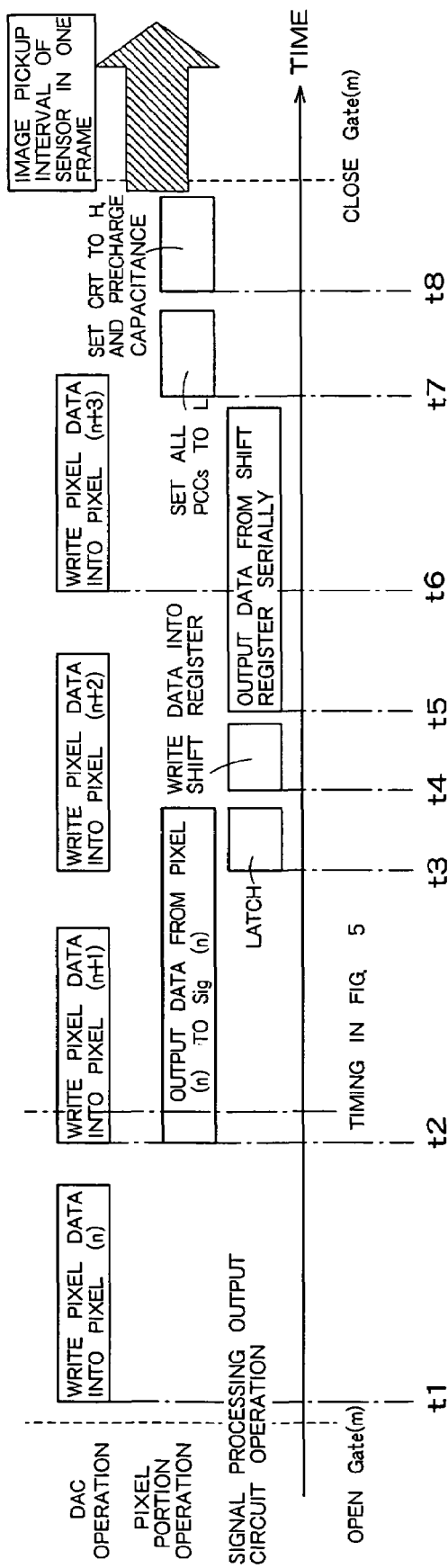
FIG. 6 is a timing diagram of processing operation conducted in the circuit shown in FIG. 5.

FIG. 6 is a timing diagram for the processing operation shown in FIG. 5. FIG. 7 is a detailed timing diagram. First, writing digital pixel data into the pixel n is started at time t1. Thereafter, writing digital pixel data into the pixel (n+1) is started at time t2. In addition, both CRT (m) and SFB (n) are temporarily turned on, and data obtained by representing the potential at the capacitor C1 by binary data is stored in the SRAM 34. Thereafter, the picked-up image data in the pixel n is output to the signal line n. If the light pen is close to the pixel n or the finger is close to the pixel n, light emitted from pixels on the display apparatus is reflected by the surface of the finger and light leak is caused on the optical sensor of the pixel n. As a result, the potential at the capacitor C1 is lowered. An L (low) signal in the digital signal is obtained by the binary operation of the SRAM 34, and is output into the signal line n. On the other hand, in the case of a pixel that is not subject to light reflected by the light pen or the finger surface, the potential at the capacitor C1 is not lowered and it is output as an H (high) signal after the binary operation. Thereafter, at time t3, writing digital pixel data into the pixel (n+2) is started, and the picked-up image of the pixel n on the signal line is latched in the signal processing output circuit 4. Thereafter, writing into the shift register 18 is conducted, and then the picked-up image data is output serially from the shift register 18.

Thereafter, at time t6, writing digital pixel data into the pixel (n+3) is started. Thereafter, at time t7, the signal PCC is set to a low level. Thereafter, at time t8, the sensor capacitance (capacitor C1) is precharged. And after one frame, the SRAM 34 operates to output the binary data expressing whether the potential at the sensor capacitance has degraded.

In the present embodiment, a multiplexer is provided in the scanning line drive circuit 3 with respect to the column (vertical) direction. While displaying one screen of red/blue/green, interlace drive is conducted three times. In the interlace drive, scanning is not conducted in order beginning with the first row, but scanning is conducted every several rows. When calculating coordinates pointed by a finger or the like, three rows may be considered in a lump. It suffices to conduct calculation on the basis of the picked-up image data at some row included in several consecutive rows. By doing so, coordinates in the vertical direction are calculated three times during the display of one screen. In three screens of red/blue/green, calculation is conducted nine times.

By the way, the interlace drive for displaying one screen is not restricted to three times. If the number of the shift registers is decreased and the number of the multiplexers is increased, the number of scans during one frame interval can be increased. It becomes possible to follow a faster movement of the light pen, the finger or the like. Conversely, if the number of the shift registers is increased and the number of the multiplexers is decreased, the position precision is improved.

Figures 8A, 8B:
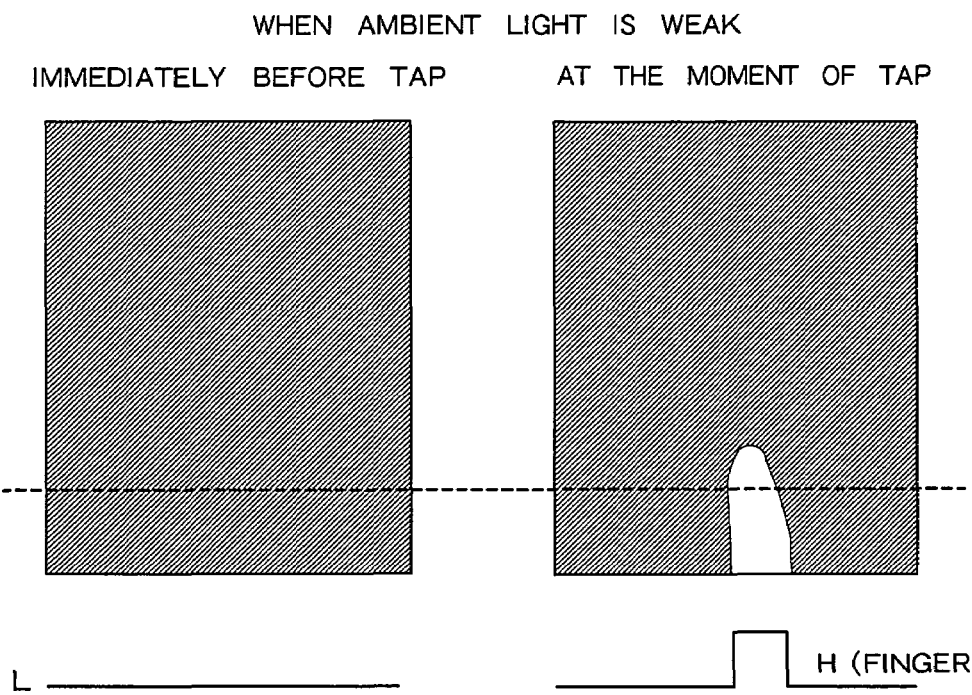
FIGS. 8A to 8D are diagrams showing images taken in by a sensor before and after a finger touches the surface of a pixel array unit 1.

FIG. 8(a) and FIG. 8(b) are diagrams showing images taken in by a sensor before and after a finger touches the surface of the pixel array unit 1. In the case where the surroundings are not bright, for example, inside of a room, before the finger touches the surface, there is no object that reflects light from the pixel array unit 1 near the pixel array unit 1, and consequently the image taken in becomes black all over the surface as shown in FIG. 8(a). If the finger touches the pixel array unit 1 or the finger is brought close to the pixel array unit 1, only the image of a shadow portion of the finger taken in by the sensor becomes white as shown in FIG. 8(b).

If the finger is brought close to the pixel array unit 1, black dark and white bright portions are thus formed in the image taken in. Therefore, the position of the finger on the screen can be identified accurately by detecting a boundary between the black and white portions on the basis of values of the picked-up image data.

In the vicinity of the contour of the finger, however, outdoor daylight is intercepted and reflection of light emitted from the pixel array unit 1 is weak. As a result, the vicinity of the contour of the finger becomes black. Therefore, it is desirable to use a central part of a white portion surrounded by a black portion to obtain the coordinates pointed by the finger.

Figures 8C, 8D:
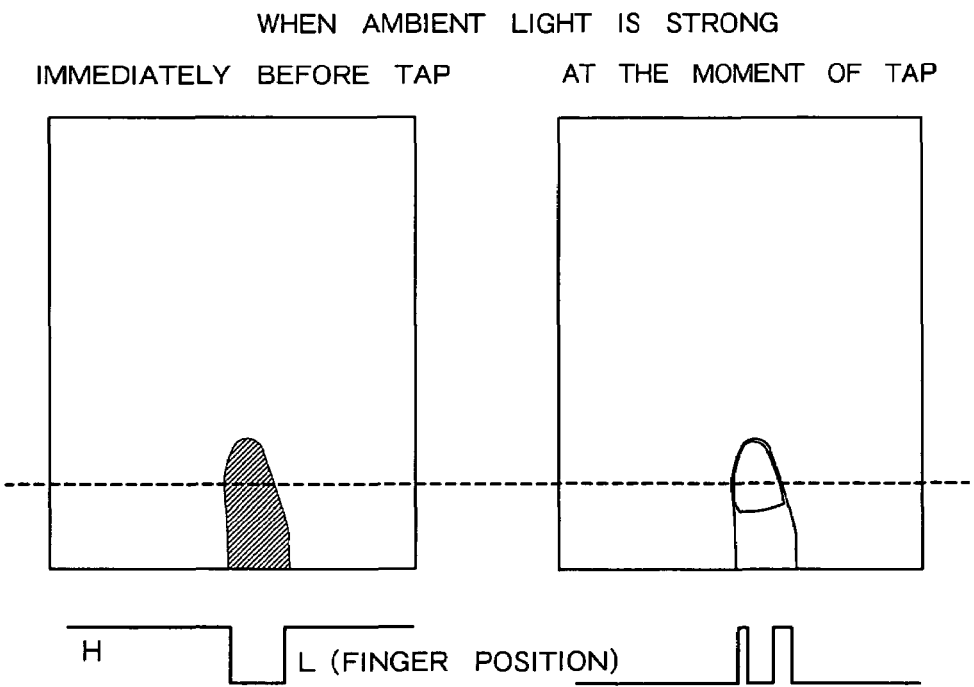

On the other hand, in a place where the surroundings are bright as in the outdoors, sensors in the place where the finger does not touch the surface react to outdoor daylight and the image taken in becomes nearly white all over the surface. If in this state the finger is brought close to the pixel array unit 1, the finger intercepts the outdoor daylight and forms a shadow, resulting in the picked-up image data that is black only in the finger portion as shown in FIG. 8(c). And if the finger touches the pixel array unit 1, a surface touched by the finger reflects the light emitted from the pixel array unit 1 and becomes white as shown in FIG. 8(d). In the vicinity of the boundary of the finger, however, outdoor daylight is intercepted and reflection of light emitted from the pixel array unit 1 is weak. As a result, the vicinity of the boundary of the finger becomes black. Therefore, it is desirable to use a central part of a white portion surrounded by a black portion to obtain the coordinates pointed by the finger.

Figure 9:
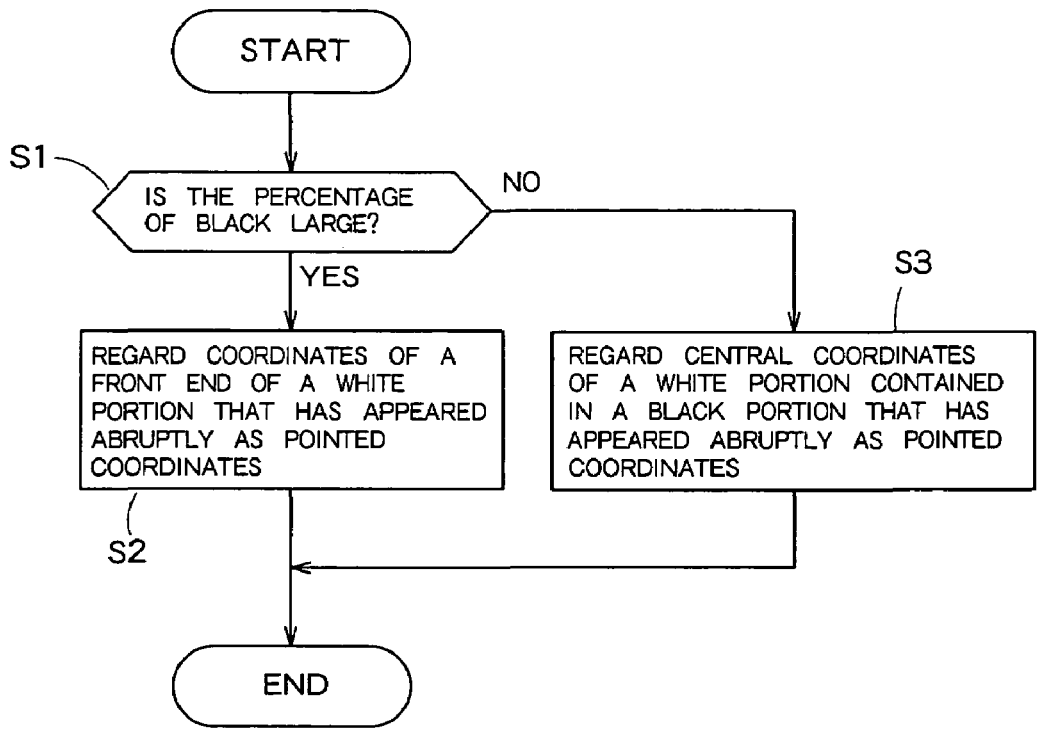
FIG. 9 is a flow chart showing a processing procedure used to calculate coordinates indicated by a finger.

FIG. 9 is a flow chart showing an example of a processing procedure for calculating the coordinates pointed by the finger. This flow chart is executed by the signal processing output circuit 4 or the controller 6. First, it is determined whether the percentage of black in the images taken in by the sensor corresponding to one screen is greater than the percentage of white (step S1). If the percentage of black is greater, then the surroundings are judged to be dark, and coordinates of a tip portion of a region in which the picked-up image data has abruptly changed from black to white are regarded as pointed coordinates touched by the finger (step S2).

On the other hand, if the percentage of white is greater than the percentage of black, then the surroundings are judged to be bright, and central coordinates of a white portion included in a region that has changed from white to black are regarded as pointed coordinates touched by the finger (step S3).

A calculation technique of pointed coordinates touched by the finger will now be described in detail. It is desirable that this calculation is conducted on an array substrate. The reason is as follows: if this calculation is conducted in an external IC, white/black data corresponding to all pixels must be output from the array substrate and consequently not only the power dissipation increases but also it takes a considerably long time to detect the coordinates.

As an example, the so-called QVGA panel having 320×240 dots will now be described. It is supposed that each pixel has coordinates (x, y), where x is 0, 1, . . . , 319 and y is 0, 1, . . . , 239.

Figure 10:
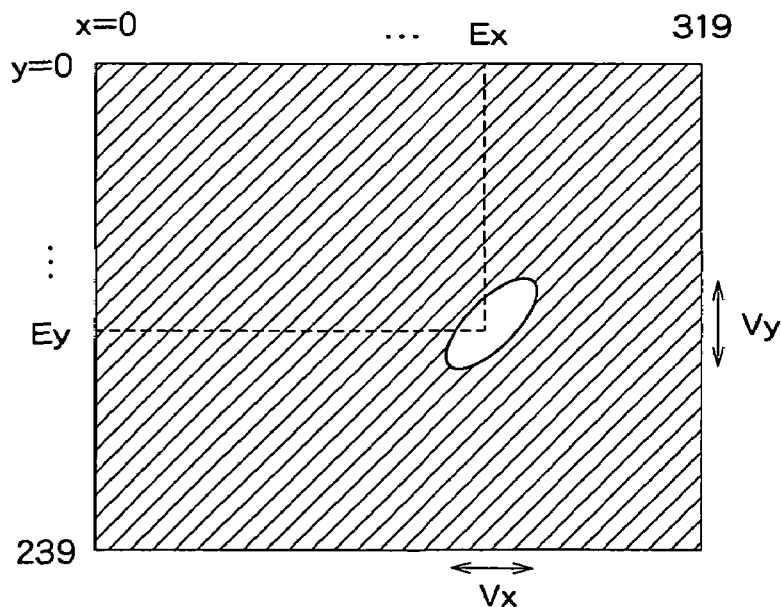
FIG. 10 is a diagram showing coordinates on a screen.

Coordinates (Ex, Ey) pointed by the finger shown in FIG. 10 are obtained using expression (1).

$$Ex = \frac{\sum_{y=0}^{239}\sum_{x=0}^{319} xL(x,y)}{\sum_{y=0}^{239}\sum_{x=0}^{319} L(x,y)} \quad Ey = \frac{\sum_{y=0}^{239}\sum_{x=0}^{319} yL(x,y)}{\sum_{y=0}^{239}\sum_{x=0}^{319} L(x,y)} \quad (1)$$

$\Sigma L(x, y)$ in the denominator of the expression (1) becomes the total number of white pixels.

An area (Vx, Vy) of the finger is obtained using expression (2).

$$Vx = \frac{\sum_{y=0}^{239}\sum_{x=0}^{319} (x-Ex)^2 L(x,y)}{\sum_{y=0}^{239}\sum_{x=0}^{319} L(x,y)} \quad Vy = \frac{\sum_{y=0}^{239}\sum_{x=0}^{319} (y-Ex)^2 L(x,y)}{\sum_{y=0}^{239}\sum_{x=0}^{319} L(x,y)} \quad (2)$$

In the present embodiment, the pixel array unit 1 is divided into eight parts in the signal line direction to calculate the coordinates pointed by the finger. In this case, an added value W of the picked-up image data corresponding to one screen is represented by expression (3) and the x coordinate Ex of the pointed coordinates is represented by expression (4).

$$W = \sum_{y=0}^{239}\sum_{x=0}^{319} L(x,y) \quad (3)$$

$$Ex = \frac{1}{W}\sum_{y=0}^{239}\sum_{x=0}^{319} xL(x,y) \quad (4)$$

$$= \frac{1}{W}\sum_{y=0}^{239}\sum_{x=0}^{39}(xL(x,y)+(40+x)L(40+x,y)+\ldots+(280+x)L(280+x,y))$$

$$= \frac{1}{W}\sum_{y=0}^{239}\left(\sum_{x=0}^{39}(xL(x,y)+xL(40+x,y)+\ldots+xL(280+x,y)+40\cdot\sum_{x=0}^{39}L(40+x,y)+\ldots+280\cdot\sum_{x=0}^{39}L(280+x,y)\right)$$

Here, equations (5) are defined.

$$X_0(y)=\sum_{x=0}^{39}xL(280+x,y) \quad X_1(y)=X_0(y)=\sum_{x=0}^{39}xL(40+x,y) \quad (5)$$

The expression (4) can be represented by expression (6).

$$X_7(y)=\sum_{x=0}^{39}xL(280+x,y) \quad (6)$$

$$W_0(y)=\sum_{x=0}^{39}L(x,y) \quad W_1(y)=\sum_{x=0}^{39}L(40+x,y)\ldots$$

$$X_7(y)=\sum_{x=0}^{39}L(280+x,y)$$

"W" in the expression (6) is represented by expression (7).

$$W=\sum_{y=0}^{239}(W_0(y)+W_1(y)+\ldots+W_y(y)) \quad (7)$$

In the same way, Ey becomes as shown in expression (8).

$$E_y=\frac{1}{W}\sum_{y=0}^{239}\sum_{x=0}^{319}yL(x,y)=\frac{1}{W}\sum_{y=0}^{239}y(W_0(y)+W_1(y)+\ldots+W_7(y)) \quad (8)$$

Figure 11:
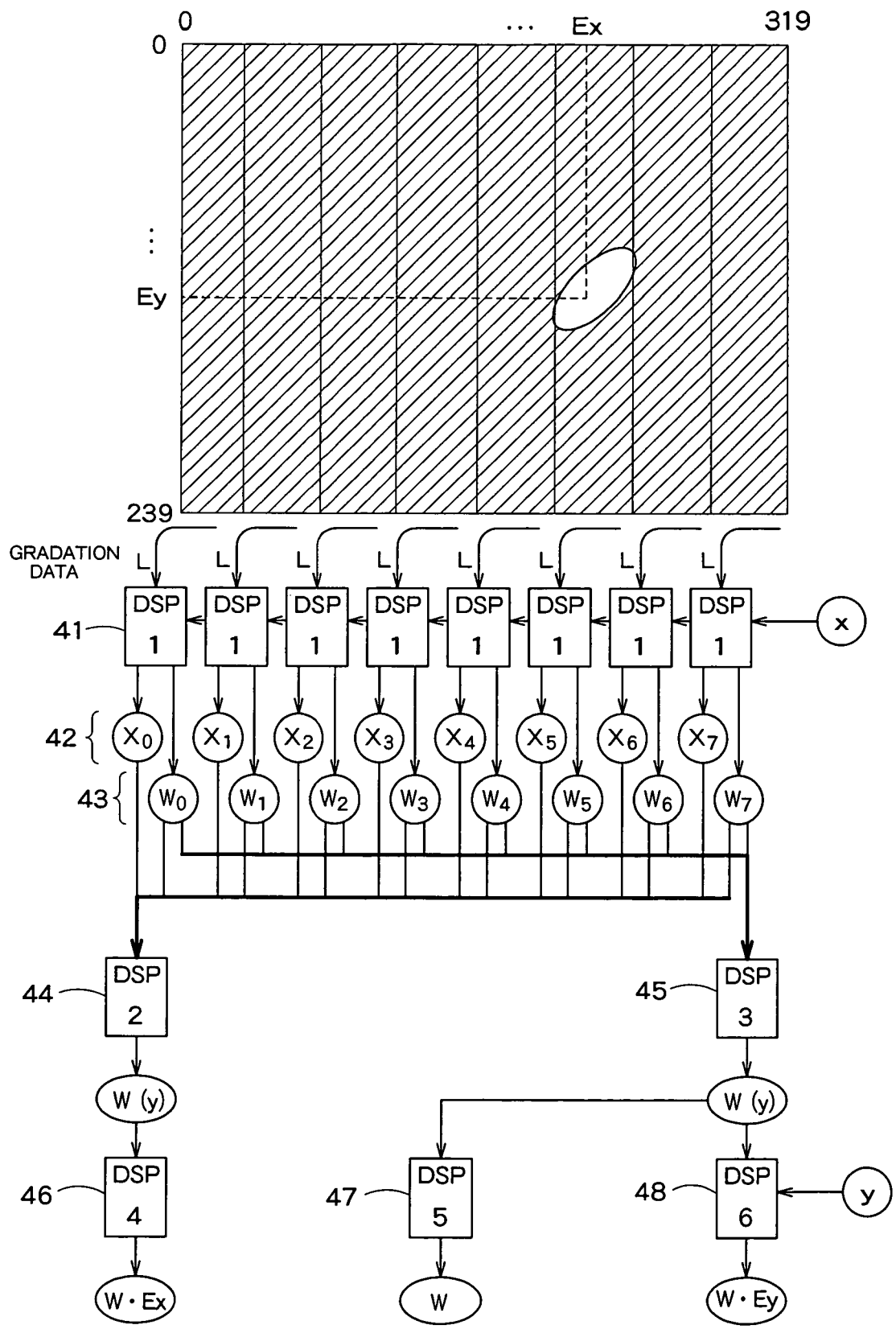
FIG. 11 is a block diagram showing an example of an internal configuration of a signal processing output circuit 4.

The above-described coordinate calculation is conducted by the signal processing output circuit 4 or the controller 6. FIG. 11 is a block diagram showing an example of an internal configuration of the signal processing output circuit 4 in the case where the coordinate calculation is conducted in the signal processing output circuit 4. The internal configuration shown in FIG. 11 substitutes for the precharge circuit 16, the four-selection decoder 17, the shift register 18 and the output buffer 19 shown in FIG. 1.

The signal processing output circuit 4 in FIG. 11 includes n DSPs 41 connected in cascade to conduct computation represented by the expression (5), registers 42 which store Xi(y) (0≦i≦7) calculated by the DSPs 41, registers 43 which store Wi(y) (0≦i≦7) calculated by the DSPs 41, a DSP 44 which conducts computation represented by the expression (9), a DSP 45 which conducts computation represented by expression (10), a register X(y), a register W(y), a DSP 46 which conducts computation represented by expression (11), a DSP 47 which conducts computation represented by expression (12), and a DSP 48 which conducts computation represented by expression (13).

$$X(y)=X_0(y)+X_1(y)+\ldots+X_7(y)+40\cdot W_1(y)+\ldots+280\cdot W_7(y) \quad (9)$$

$$W(y)=W_0(y)+W_1(y)+\ldots+W_7(y) \quad (10)$$

$$E_x\cdot W=\sum_{y=0}^{239}X(y) \quad (11)$$

-continued $$E_y \cdot W = \sum_{y=0}^{239} W(y) \quad (12)$$

$$W = \sum_{y=0}^{239} W(y) \quad (13)$$

It is advantageous to incorporate these circuits on the LCD substrate 1 using the low temperature polysilicon TFT technique or the like. It is advantageous to deliver only results of product sum computations represented by the expressions (11), (12) and (13) to the external IC as compared with a configuration in which all bit maps of the whole screen are delivered to the external IC. A final coordinate calculation is conducted by the external IC. As the quantity of data delivered to the external IC for that purpose is decreased, however, it becomes advantageous as regards the time required for coordinate detection and power dissipation. It is disadvantageous to conduct the calculations of the expressions (1) and (2) as well on the LCD substrate 1. Because the circuit which conducts "division" in the expressions (1) and (2) is typically complicated and a frame area (in which a computation circuit is formed) that is included on the LCD substrate and that is not a display area becomes large. It is desirable to confine the processing conducted on the LCD substrate 1 to "the product sum computation in which calculation can be conducted every row and addition can be conducted successively" such as the expression (11), the expression (12) or the expression (13). It is advantageous to conduct a complicated calculation such as "division conducted on the basis of data of all pixels" in an external semiconductor such as the controller 6. The right side of each of the expressions (11), (12) and (13) is not a quantity that cannot be calculated until all data are output. Each time data of each row is output, the right side can be calculated. If calculation can be thus conducted in parallel without waiting for output of all data, there are an advantage that the time required until the coordinates are fixed after the data output can be shortened, and an advantage that a circuit formed of low temperature polysilicon TFT having a comparatively slow operation speed as calculation hardware can be used. Thus, in the liquid crystal display apparatus having the image take-in function in the present embodiment, a black-white change obtained in the picked-up image data when the finger is brought close to or brought into contact with the pixel array unit 1 is detected, and the coordinate position of the finger is identified taking the ambient brightness into consideration. Regardless of whether the surroundings are bright or dark, therefore, the coordinate position can be detected with high precision.

Furthermore, when conducting the coordinate detection, the picked-up image data corresponding to all pixels are not detected, but the picked-up image data are detected every a plurality of pixels in both the signal line direction and the scanning line direction. Therefore, the time taken to detect the coordinates can be shortened.

Furthermore, the picked-up image data for which the coordinate position is to be calculated may be the picked-up image data (processed image) obtained by applying image processing, such as noise removal or detection of a specific shape (a shape for identifying the finger or a pointing member), to the picked-up image. As a result, the detection precision can be improved.

The sensor density may not be "pixel: sensor=1:1," but may be "ten pixels:one sensor." The sensors may be disposed only in the outermost circumference of the display area.

In the above-described embodiment, the example in which the present invention is applied to the liquid crystal display has been mainly described. However, the present invention can be applied to plane display apparatuses of all kinds having the image take-in function.

SECOND EMBODIMENT

In a second embodiment, coordinate detection of the finger is conducted on the basis of a difference image between two images picked up consecutively.

Figure 12:
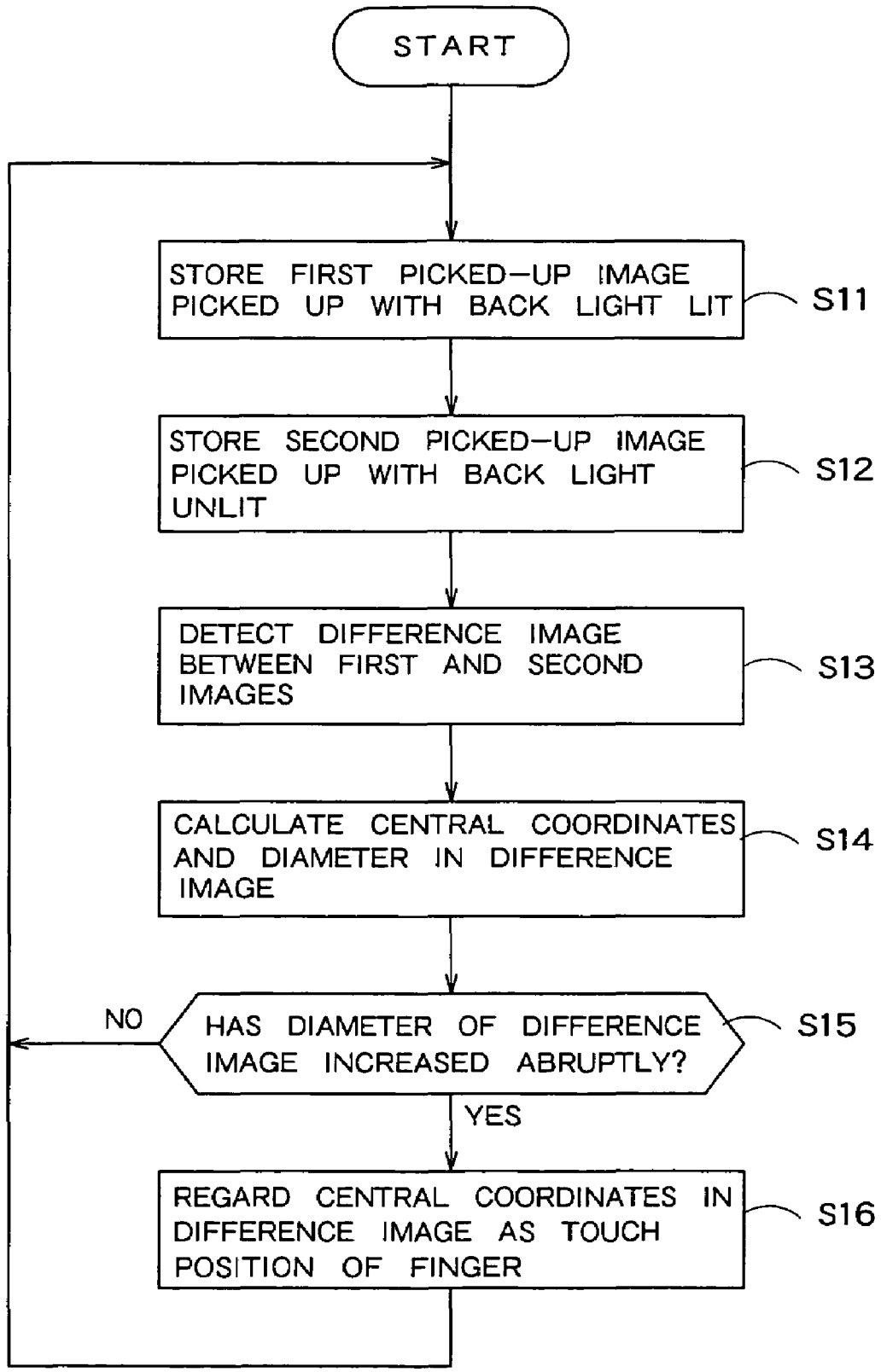
FIG. 12 is a flow chart showing finger coordinate detection processing conducted by a signal processing output circuit 4 or a controller 6.

FIG. 12 is a flow chart showing a coordinate detection processing of the finger conducted by the signal processing output circuit 4 or the controller 6. FIG. 13 is a diagram showing an example of a picked-up image. First, image pickup corresponding to one frame is conducted with the back light lit. A result of the image pickup (hereafter referred to as first image) is stored in a storage not shown (step S11).

Figure 13A:
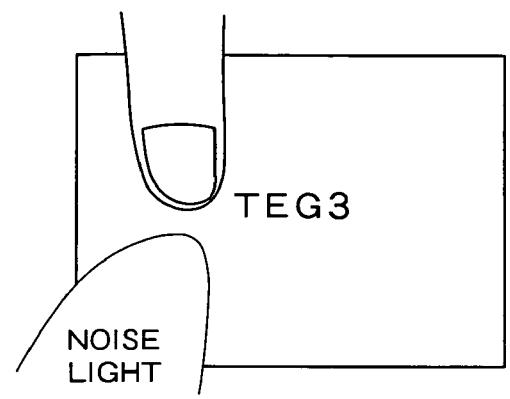
FIGS. 13A to 13D are diagrams showing an example of an image picked up.
Figure 13B:
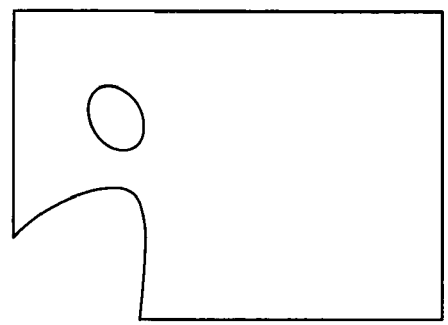

As shown in FIG. 13(a), the picked-up image contains a white portion generated by noise light regardless of whether the back light is lit. In the state in which the back light is lit, an image containing a white portion generated by the finger and a white portion generated by noise light is obtained as shown in FIG. 13(b).

Figure 13C:
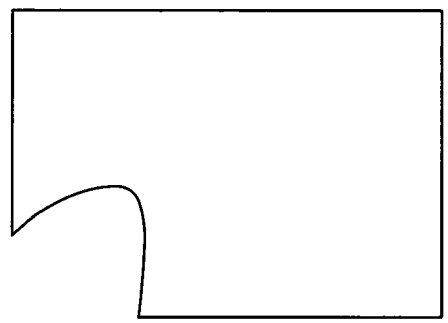

Subsequently, image pickup corresponding to one frame is conducted with the back light unlit. A result of the image pickup (hereafter referred to as second image) is stored in a storage not shown (step S12). In a state with the back light unlit, an image that does not contain a white portion generated by the finger and that contains a white portion generated by noise light as shown in FIG. 13(c) is obtained.

Figure 13D:
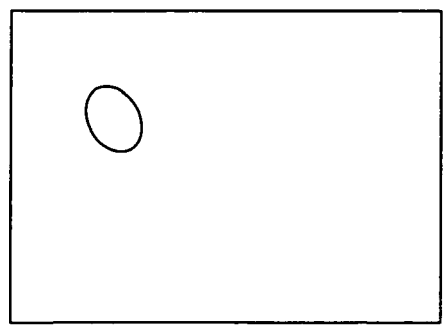

Subsequently, a difference between the first and second images (hereafter referred to as difference image) is detected (step S13). For example, it is now supposed that a result of image pickup that is white is represented by 1 and a result of image pickup that is black is represented by 0. If both images have the same color, the difference is zero. If the first image is 1 and the second image is 0, the difference is 1. By obtaining the difference between the first and second images, a difference image free from the white portion generated by noise light as shown in FIG. 13(d) is obtained.

Subsequently, central coordinates and a diameter in the difference image are calculated using the expression (1) and the expression (2) (step S14).

Subsequently, it is determined whether the diameter in the difference image has abruptly increased (step S15).

FIG. 14 is a diagram showing how a picked-up image changes according to the distance between the finger and the pixel array unit 1. FIG. 14(a) is a diagram schematically showing the distance between the finger and the pixel array unit 1. FIG. 14(b) shows the case where the distance=5 mm. FIG. 14(c) shows the case where the distance=2 mm. FIG. 14(d) shows the case where the distance=0 mm. FIG. 14(e) shows the case where the distance=0 mm and the finger is pressed against the pixel array unit 1. In the case where the distance=5 mm and the case where the distance=2 mm, light reflected by the bulb of the finger hardly arrives at the sensors in the pixel array unit 1. If the distance=0 mm, only a portion for which light reflected by the bulb of the finger is input to sensors becomes white. The area of the white portion becomes large when the finger is pressed against the pixel array unit 1.

If it is judged at the step S14 shown in FIG. 12 that the diameter in the difference image has abruptly increased, therefore, it can be judged that the finger has positively touched the pixel array unit 1. In this case, the central coordinates in the difference image are regarded as the touch position of the finger (step S16), and the processing returns to the step S11. On the other hand, if it is judged at the step S15 that the diameter in the difference image has not increased abruptly, it is judged that the finger has not touched the pixel array unit 1, and the processing returns to the step S11.

Figure 15:
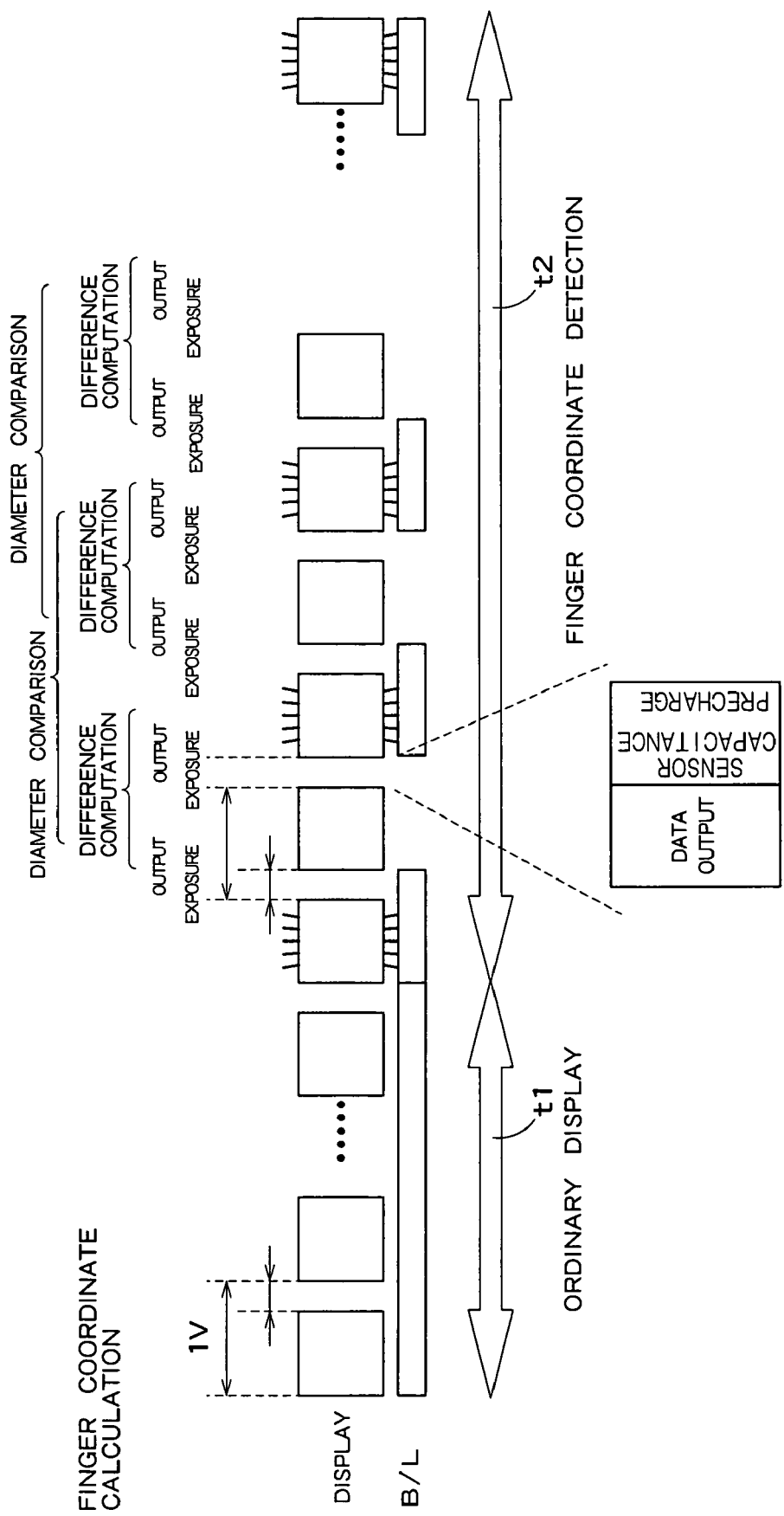
FIG. 15 is an operation timing diagram in a second embodiment.

FIG. 15 is an operation timing diagram in a second embodiment. As shown in FIG. 15, an ordinary display period t1 and a finger coordinate detection period t2 are provided. In the ordinary display period, finger coordinate detection is not conducted. During this interval, a display analog voltage is supplied from the signal line drive circuit 2 to the signal lines and scanning lines in respective rows are driven by the scanning line drive circuit 3 in a predetermined order. Screen display is repeated on a cycle of 50 times per second (50 Hz, i.e., 20 msec).

In the finger coordinate detection period, coordinate detection of the finger is conducted while conducting the display. Specifically, ON/OFF of the back light is repeated every frame. Therefore, the screen looks as if it is blinking to the user, and it is thus possible to inform the user of the finger coordinate detection period. If the frequency of the blinking becomes higher than 50 Hz, it becomes "flicker of the screen" and hurts the user's feelings in some cases. In such a case, the frequency of blinking should be approximately 15 Hz or less.

Each frame interval (20 ms) includes a display period (16 msec) over which scanning lines are actually driven to write a video signal into pixels and a blank interval (4 msec) lasting since writing into the final line is completed until writing of the next frame is started. In the blank interval, data are output from the sensors in the pixels and the sensor capacitance in each pixel is precharged in preparation for the image pickup in the next frame. The data output and the sensor capacitance precharge are conducted every frame.

In the finger coordinate detection period, the back light is periodically turned on/off as shown in FIG. 15 and the difference image is detected repeatedly according to the procedure shown in FIG. 12.

Thus, in the second embodiment, the touch position of the finger is detected on the basis of the difference image between the image picked up with the back light lit and the image picked up with the back light unlit. As a result, the touch position of the finger can be detected with high precision without being affected by noise light.

THIRD EMBODIMENT

In the above-described second embodiment, the example in which the back light is turned on/off in the finger coordinate detection period has been described. However, the difference image may also be detected by changing the color of the whole pixel array unit 1 while continuously turning on the back light.

More specifically, in the finger coordinate detection period, black is displayed on the whole pixel array unit 1 each time image pickup corresponding to one frame is conducted. And a difference image is detected as a difference between an image picked up when black is displayed and an image picked up when black is not displayed. If black is displayed on the whole pixel array unit 1, light from the pixel array unit 1 is not applied to the bulb of the finger and reflected light from the bulb of the finger is not input to sensors. Accordingly, finger coordinate detection becomes possible in the same way as the second embodiment.

Thus, in the third embodiment, it is not necessary to turn on/off the back light. Therefore, the control of the back light is simplified and a lifetime of the back light can be improved.

In addition, as for display of two kinds for acquiring the difference image, various ways are conceivable. The point is that two kinds of display are conducted and the first display contains much "white" in a picked-up image of a portion pointed by the pointing member such as the finger whereas the second display contains much "black" (i.e., the image pickup contrast ratio is high). Preferably, this is optimized taking the spectral characteristics of sensors and reflection characteristics of the pointing member into consideration.

FOURTH EMBODIMENT

In each of the second and third embodiments, the example in which the luminance of the whole pixel array unit 1 is changed periodically when detecting the finger coordinates has been described. However, the luminance of only a partial screen region may be changed.

A display apparatus adopting the touch screen system in which buttons are displayed on the screen and a finger is caused to touch one of the buttons is known. In the case where such a touch screen is adopted in the present embodiment, it is not necessary to alter the luminance of the whole screen at the time of finger coordinate detection, but it suffices to alter the luminance of only the display regions of the buttons.

Figure 16:
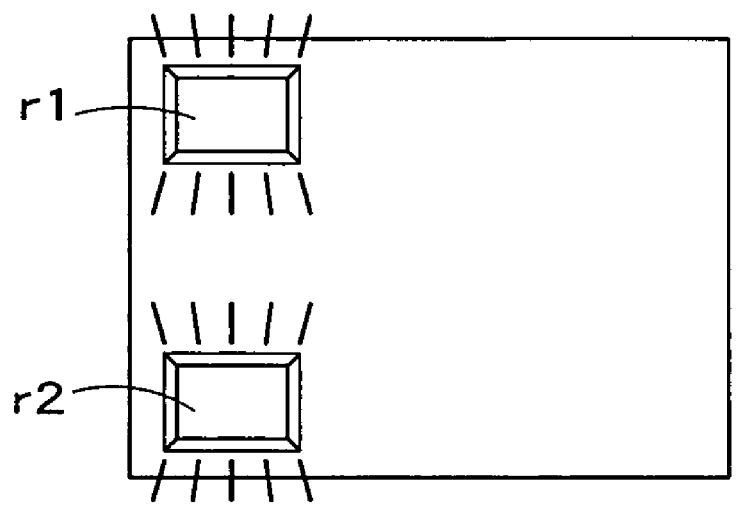
FIG. 16 is a diagram showing an example in which luminance in only button display regions r1 and r2 on a screen is altered periodically when finger coordinates have been detected.

In the present embodiment, therefore, luminance of only button display regions r1 and r2 on the screen is altered periodically at the time of finger coordinate detection as shown in FIG. 16. More specifically, the color of pixels corresponding to the display regions of the buttons is made black every frame while keeping the back light lit. As for the procedure for detecting the finger coordinates, the flow chart shown in FIG. 12 can be used as it is.

Thus, in the fourth embodiment, the luminance of only the display regions of the buttons is altered. Therefore, the burden of screen rewriting processing conducted at the time of finger coordinate detection can be lightened.

As for the display of the button portions, various variations are possible. The point is to use display of two kinds having a high image pickup contrast ratio in the same way as described at the end of the descriptions of the third embodiment.

FIFTH EMBODIMENT

In a fifth embodiment, a specific position is indicated using a pointing member other than a human finger.

There are individual differences in the surface color and thickness of human fingers. In addition, gloves are worn in some cases. Thus, there is a possibility that the detection sensitivity varies according to the human, time and case.

Figure 17:

Therefore, it is conceivable to press a spherical soft pointing member against the pixel array unit 1 to point a specific position. In the case where the display apparatus in the present embodiment is applied to portable telephone or the like, the above-described pointing member 50 is preferably attached to a strap belonging to the portable telephone or the like as shown in FIG. 17.

Figure 35A:
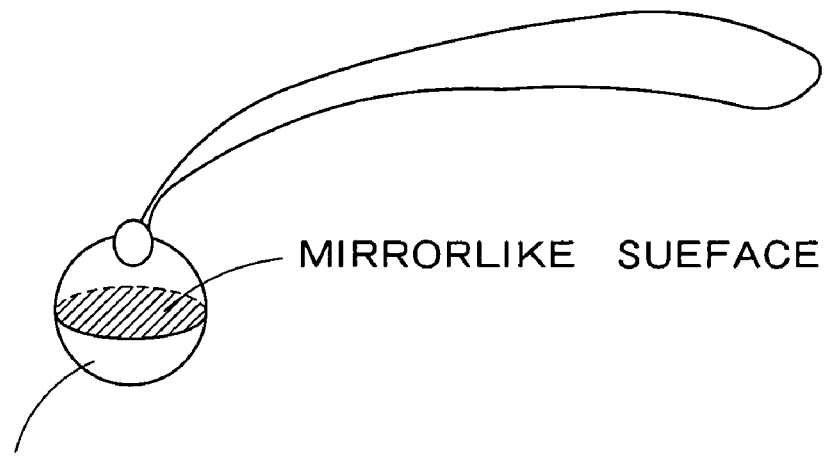
FIGS. 35A and 35B are diagrams showing variants of a pointing member.
Figure 35B:
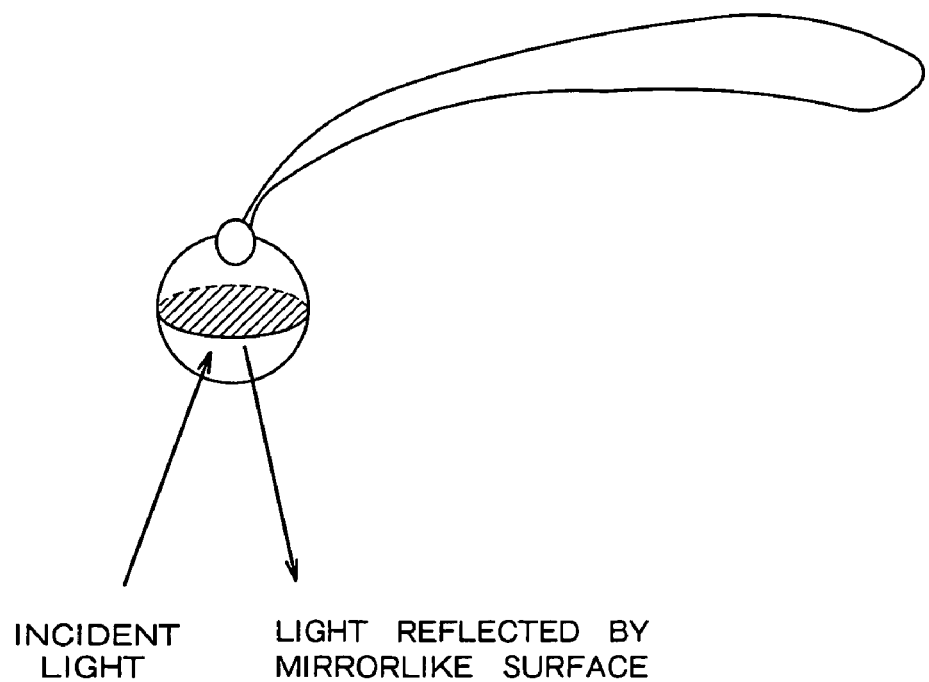

It is desirable to coat such a pointing member with paint having a reflectance of, for example, at least 50%, preferably approximately 100%. Here, as for the reflectance, reflectance of a standard white board formed by coating it with barium sulfate or the like is used as the reference. As an example of the pointing member, a photographic paper or a paper with fine quality can be used as the pointing member. A mirrorlike surface with aluminum deposited thereon by evaporation (mirrorlike reflecting surface) as shown in FIG. 35A or FIG. 35B may also be used. In this case, the surface is not the diffuse reflection surface unlike paper. Therefore, the picked-up image is not apt to get blurred, and high precision position detection becomes possible. It is desirable to dispose a protection acrylic board on the display surface to prevent the display apparatus from being broken. Or it is desirable to apply paint facilitating the image detection conducted by sensors. By selecting a soft material, the area of contact is widened when the pointing member is pressed against the pixel array unit 1 slightly. As a result, it can be detected positively as the sensor image.

Thus, in the fifth embodiment, a specific position on the pixel array unit 1 is specified using the pointing member. Without depending upon the surface color of the finger or the thickness of the finger, therefore, the finger coordinates can be detected and the precision of the finger coordinate detection is improved.

Preferably, the surface of the pointing member has a special pattern such as a checkered pattern as shown in FIG. 31. Because it is possible to regard a portion in the image pickup result from which the checkered pattern can be detected as the pointed position. As for the contact surface obtained when the pointing member is pressed strongly against the display surface, the area of contact increases from a state shown in FIG. 32 to a state shown in FIG. 33. As a result, the ratio in area of the checkered pattern to the picked-up image increases. This can be judged to be a tap. The special pattern may be either of a pattern and a shape. In addition, it is also possible to incorporate a light source not shown, such as an LED, in a pointing member and project a pattern that can be read by sensors when the pointing member touches the display surface. By the way, the area of contact of the pointing member should expand to some degree when the user presses the pointing member against the display surface. If the pointing member is too soft and the diameter increases at least 100%, on the contrary the feeling of use is worsened.

SIXTH EMBODIMENT

Typically, a fluorescent lamp is used as the back light. In the case where lighting/extinguishment of the back light is repeated in the finger coordinate detection period, an LED having a fast response speed should be used as the light source of the back light. In this case, a plurality of LEDs may be disposed uniformly on the whole pixel array unit 1, or one or a few LEDs may be disposed on an end portion of the pixel array unit 1.

Or while keeping the back light always lit at the time of the finger coordinate detection as well, a light source separate from the back light may be used to detect the finger coordinates. As for the separate light source, an LED, EL (Electroluminescence) or an infrared light source is desirable.

In the case where a finger coordinate detection period is provided between display frame intervals as shown in operation timing diagram in FIG. 18, widths of the back light lighting interval and the extinguishment interval in the finger coordinate detection period may be arbitrarily altered. As a result, phase detection can be conducted and the signal-to-noise ratio of the picked-up image is improved. In other words, lighting/extinguishment of the back light exerts the greatest influence upon the portion of light reflected by the finger or the like in the picked-up image. In this portion, data corresponding to white increase when the back light is lit, whereas data corresponding to black increase when the back light is not lit. Since other portions depend upon ambient light such as outdoor daylight, a portion that follows the lighting/extinguishment of the back light most closely can be regarded as a pointed position pointed by the finger or the like.

SEVENTH EMBODIMENT

In a seventh embodiment, a frame for picking up an image (image pickup frame) is inserted between ordinary display frames, and coordinates of the finger are detected on the basis of a difference image between two images picked up consecutively.

Figure 19:
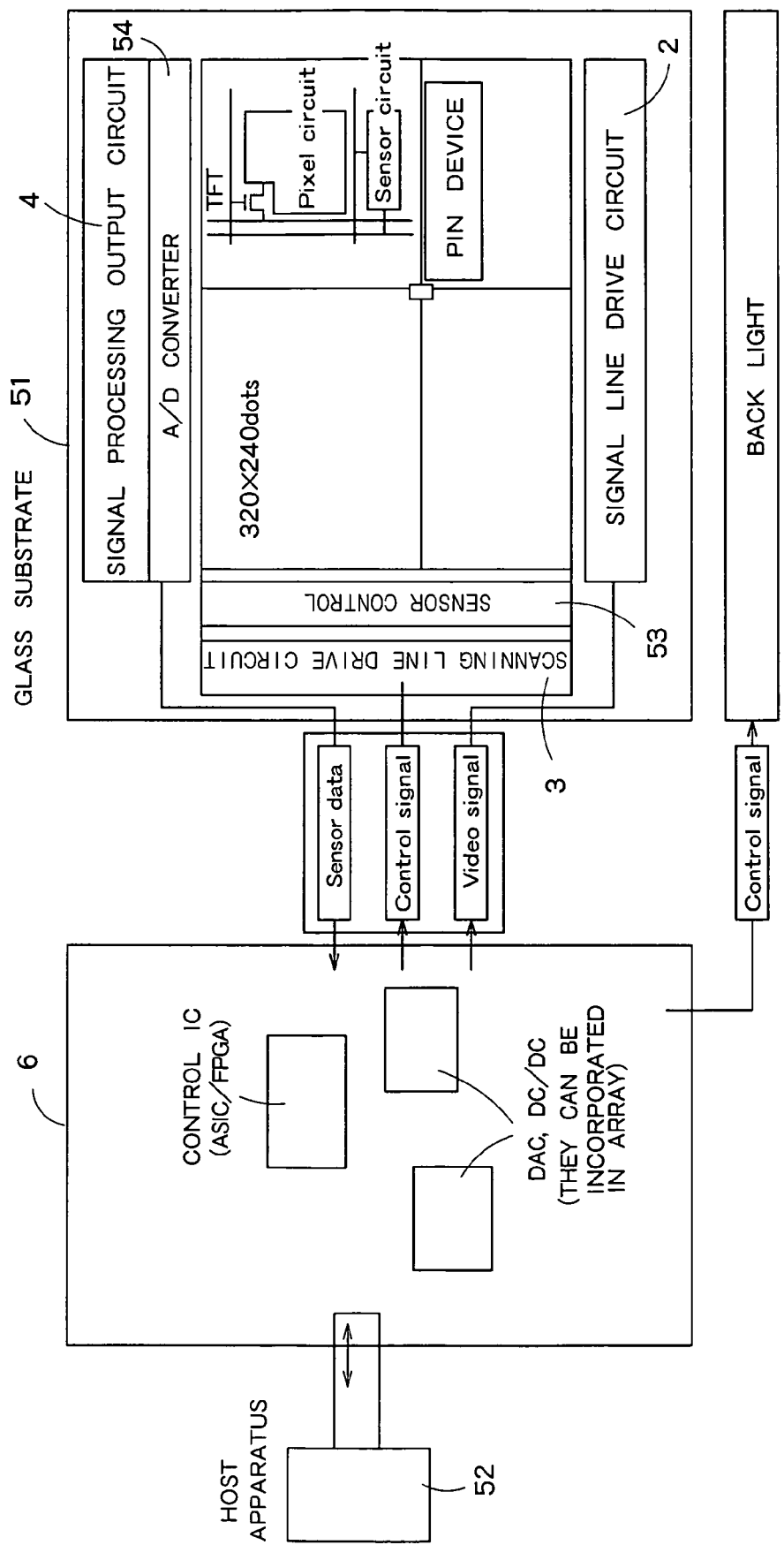
FIG. 19 is a schematic configuration diagram of a display apparatus having a circuit formed on a glass substrate by using a low temperature polysilicon TFT technique.

FIG. 19 is a schematic configuration diagram of a display apparatus including a circuit formed on a glass substrate 51 by using the low temperature polysilicon TFT technique, an external controller 6, and a host apparatus 52. A pixel array unit 1, a signal line drive circuit 2, a scanning line drive circuit 3, a signal processing output circuit 4, a sensor controller 53, and an A/D converter 54 are formed on the glass substrate 51. Besides supplying display data to the glass substrate 51, the controller 6 determines coordinates pointed by the finger or determines whether a tap (click operation using the finger) order is given, on the basis of image data output from the signal processing output circuit 4 on the glass substrate 51.

Figure 20:
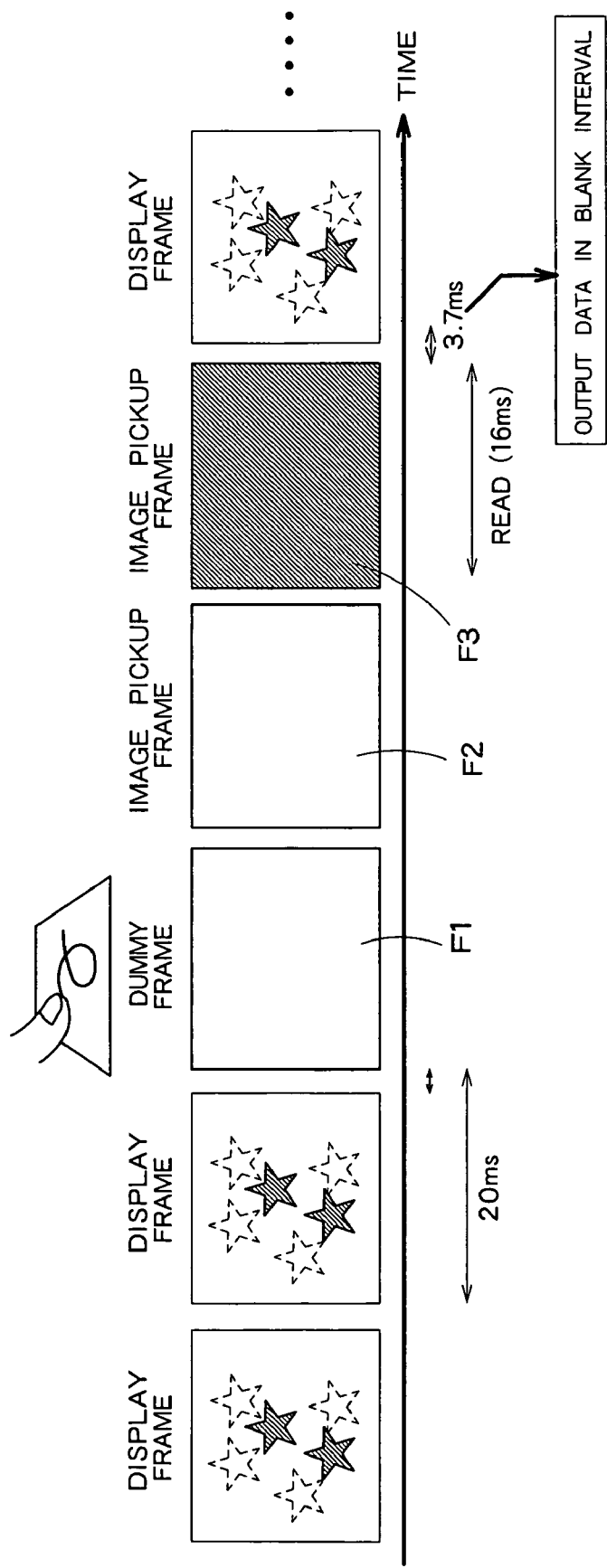
FIG. 20 is a diagram showing an example in which one dummy frame and two image pickup frames are inserted in an interval between display frame periods.

In the ordinary display in which input using the finger is not accepted, display data is supplied from the controller 6 to the glass substrate 51 at a frame frequency of 50 Hz. In a state in which the finger input is accepted, three frames F1, F2 and F3 for image pickup are inserted between display frames as shown in FIG. 20. One of the frames is the dummy frame F1, and remaining two frames are image pickup frames F3.

In the dummy frame F1, the display is changed to white raster display. The response speed of the twisted nematic liquid crystal frequently used is as slow as approximately 10 ms. If an image is picked up immediately, therefore, the picture of the display frame remains as an afterimage. Accordingly, a white portion remains besides light reflected by the finger, resulting in an error in coordinate computation. In order to avoid this, the dummy frame F1 is provided.

In the image pickup frames F2 and F3, one is a white raster and the other is a black raster. As for the black raster, black is not written as the display data, but it is implemented by turning off the back light. By doing so, uniform black display can be conducted quickly even if the response of the liquid crystal is slow. Coordinate computation with noise light removed is conducted by the controller 6 by using an image picked up with the back light lit and an image picked up with the back light unlit. This is conducted using a technique similar to that in the second embodiment.

Thus, in the seventh embodiment, dummy frames are provided between a display frame and an image pickup frame. Therefore, the image pickup frame is not subjected to the influence of the afterimage of the display frame, and the image quality of the picked-up image is improved. Since two image pickup frames are provided, noise light can be removed positively.

EIGHTH EMBODIMENT

In an eighth embodiment, an image pickup frame provided between ordinary display frames is provided with a special pattern and difference computation between image pickup results in two images is made unnecessary.

Figure 21:
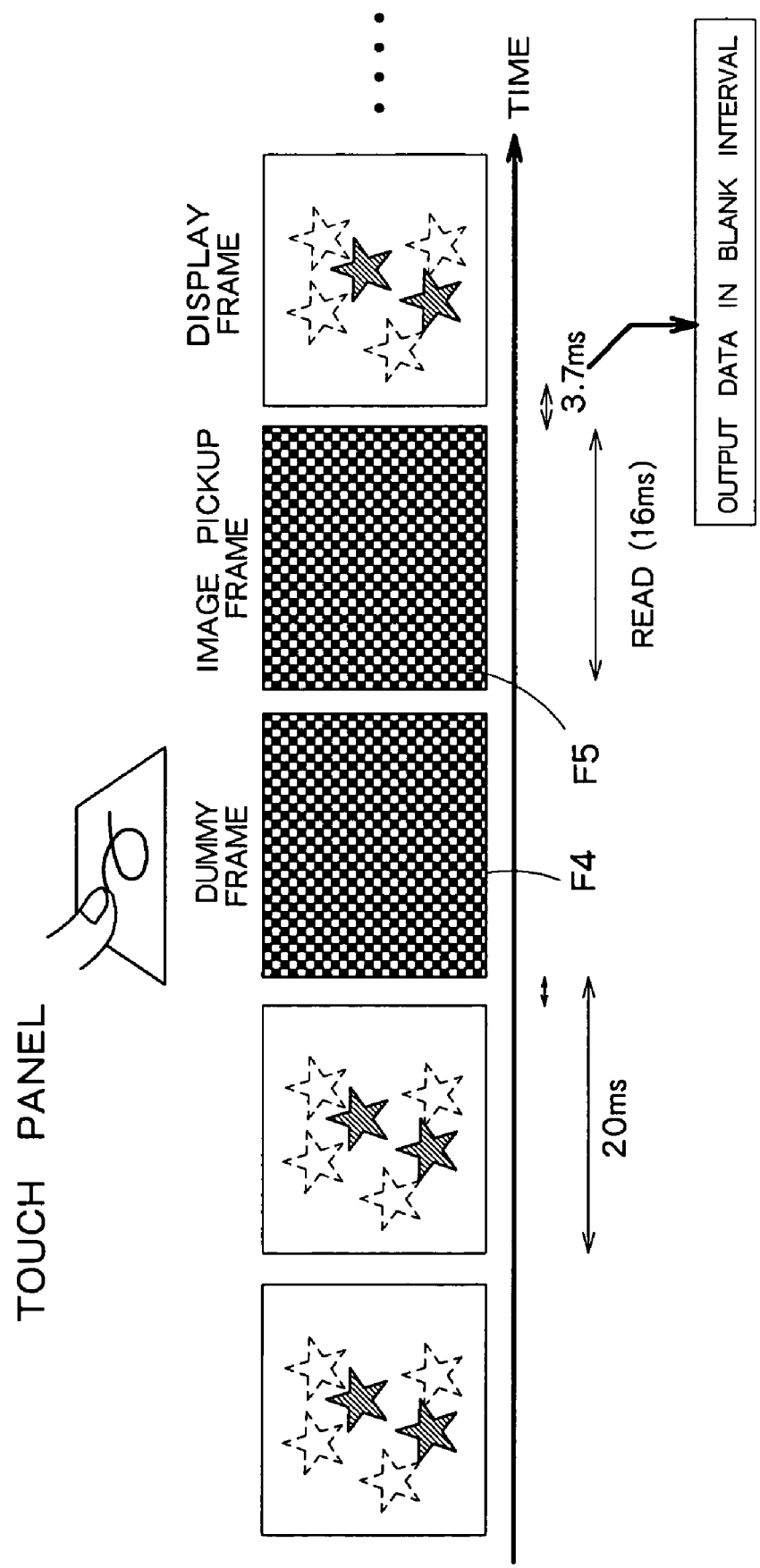
FIG. 21 is a diagram showing an example in which one dummy frame and one image pickup frame are inserted in an interval between display frame periods.

In the ordinary display in which input using the finger is not accepted, display data is supplied from the controller 6 to the glass substrate at a frame frequency of 50 Hz. In a state in which the finger input is accepted, two frames F4 and F5 for image pickup are inserted between display frames as shown in FIG. 21. One of the frames is the dummy frame F4, and the other is an image pickup frame F5.

In the dummy frame F4, the display is changed to special display. In the present example, a checkered pattern is used. The response speed of the twisted nematic liquid crystal frequently used is as slow as approximately 10 ms. If an image is picked up immediately, therefore, the picture of the display frame remains as an afterimage. Accordingly, a white portion remains besides light reflected by the finger, resulting in an error in coordinate computation. In order to avoid this, the dummy frame F4 is provided.

In the image pickup frame F5, a checkered pattern is displayed with the back light kept lit. It becomes a problem whether computation on the finger coordinates can be performed correctly in a situation where not only the finger touches the liquid crystal display surface but also noise light (the sunlight or fluorescent light) is incident on the display surface as shown in FIG. 22. In this case, the checkered pattern is displayed on the display surface. Therefore, light emitted from the liquid crystal display surface has a checkered pattern. If this is reflected by the finger, the checkered pattern is read by the sensors 33 incorporated in the liquid crystal display apparatus.

On the other hand, noise light does not depend on the brightness of the liquid crystal display surface. As for a result of image pickup conducted in the situation shown in FIG. 22, only a region touched by the finger has the checkered pattern and a portion on which the noise light is incident becomes white as shown in FIG. 23. Therefore, the controller 6 may retrieve a portion having a checkered pattern from the picked-up image data output from the liquid crystal display apparatus and compute its central coordinates. Furthermore, also in the case where tap is detected, similarly to the case of detecting the tap, a diameter of a portion having the checked pattern may be calculated to regard a sudden change of the diameter as tap.

By the way, if a repetition period of the special pattern (in the present example, fineness of the checkered pattern) is made too small, the special pattern is crushed (gets blurred) in the picked-up image and it cannot distinguish noise light from light reflected by the pointing member in some cases. Especially, when conducting the image pickup using a display apparatus that doe not have an optical system such as a micro lens, it is difficult to recognize a checkered pattern finer than a distance d0 between the finger and the optical sensor, in a state in which the finger is tapping the display surface. Conversely, if the checkered pattern is too coarse, the precision in calculating the central position of the finger becomes worse. Therefore, it is desirable that the minimum value of the width in the black and white patterns in the checkered pattern is greater than d0, preferably in the range of approximately twice to five times as large as d0. In the present embodiment, the glass substrate has a thickness of 0.4 mm and the optical film such as the sheet polarizer has a thickness of 0.2 mm, and consequently it follows that d0=0.4+0.2=0.6 mm. The checkered pattern includes a combination of 1.2 mm square white squares and 1.2 mm square black squares.

As for the special pattern used in the image pickup frame, various variations are possible. A lattice pattern as shown in FIG. 34 may also be used. In the checkered pattern, the number of white pixels per unit area is equal to the number of black pixels. On the other hand, in the lattice pattern, the number of white pixels becomes larger. As the number of white pixels per unit area in the special pattern becomes larger than the number of black pixels, the quantity of light striking against the finger or the pointing member increases, and the quantity of light that is reflected by the finger or the pointing member and that is incident on the sensors increases, resulting in detection in a shorter time. On the other hand, if the percentage of white pixels is extremely increased, the capability of distinguishing noise light from light reflected by the pointing member deteriorates. It is desirable that the ratio of the number of white pixels to the number of black pixels per unit area is in the range of 2 to 9.

It is now supposed that each black pixel has a width of "a" and each white pixel has a width of "b" in FIG. 34. Denoting an interval obtained when the sensors are in closest vicinity to the subject of image pickup by d0, it is necessary to satisfy the following expressions (14) to (16).

$$2 \le \frac{a}{d0} \le 5 \qquad (14)$$

$$2 \le \frac{b}{d0} \le 5 \qquad (15)$$

$$2 \le \frac{(a+b)^2 - a^2}{a^2} \le 9 \qquad (16)$$

The expressions (14) and (15) indicate that a value obtained by dividing the width of the black pixels or the white pixels by d0 should be set to in the range of 2 to 5. The range of 2 to 5 is an experience-based value. The expression (16) indicates that the percentage of the area of the white pixels per unit area should be set in the range of 20% to 90%. The range of 20% to 90% is an experience-based value.

Colors used in the special pattern are not restricted to white and black. The colors need only be two colors having a high image pickup contrast ratio. It is desirable to optimize the two colors taking the spectral characteristics of sensors and reflection characteristics of the pointing member as well into consideration. Considering that outdoor daylight might be incident on the display surface as if it has the special pattern, it is desirable to use a pattern that is hard to be imitated by outdoor daylight. Furthermore, the special pattern is not restricted to a single pattern. It is also possible to prepare several special patterns for the image pickup frame and use a combination of them.

FIG. 24 is a diagram showing an example in which image pickup is conducted using a plurality of special patterns. In FIG. 24, a checkered pattern is displayed and its image is picked up. A checkered pattern portion is retrieved from a result of the image pickup. In the next image pickup frame, a vertically-striped pattern is displayed and its image is picked up. A vertically-striped portion is retrieved from a result of the image pickup.

FIG. 25 is a diagram showing picked-up images obtained by image pickup using the special patterns shown in FIG. 24. FIG. 25(a) shows an image picked up when the checkered pattern is used. FIG. 25(b) shows an image picked up when the vertically-striped pattern is used. If a vertically-striped pattern portion is detected in substantially the same position as that of a checkered pattern portion as shown in FIG. 25, it is regarded as the finger coordinates. If only one of them is in the position, it is judged that vertically-striped noise light is unfortunately incident. In this way, the distinguishing power for the finger can be enhanced. As a result, the probability of false operation caused by noise light can be further decreased.

Figure 26:
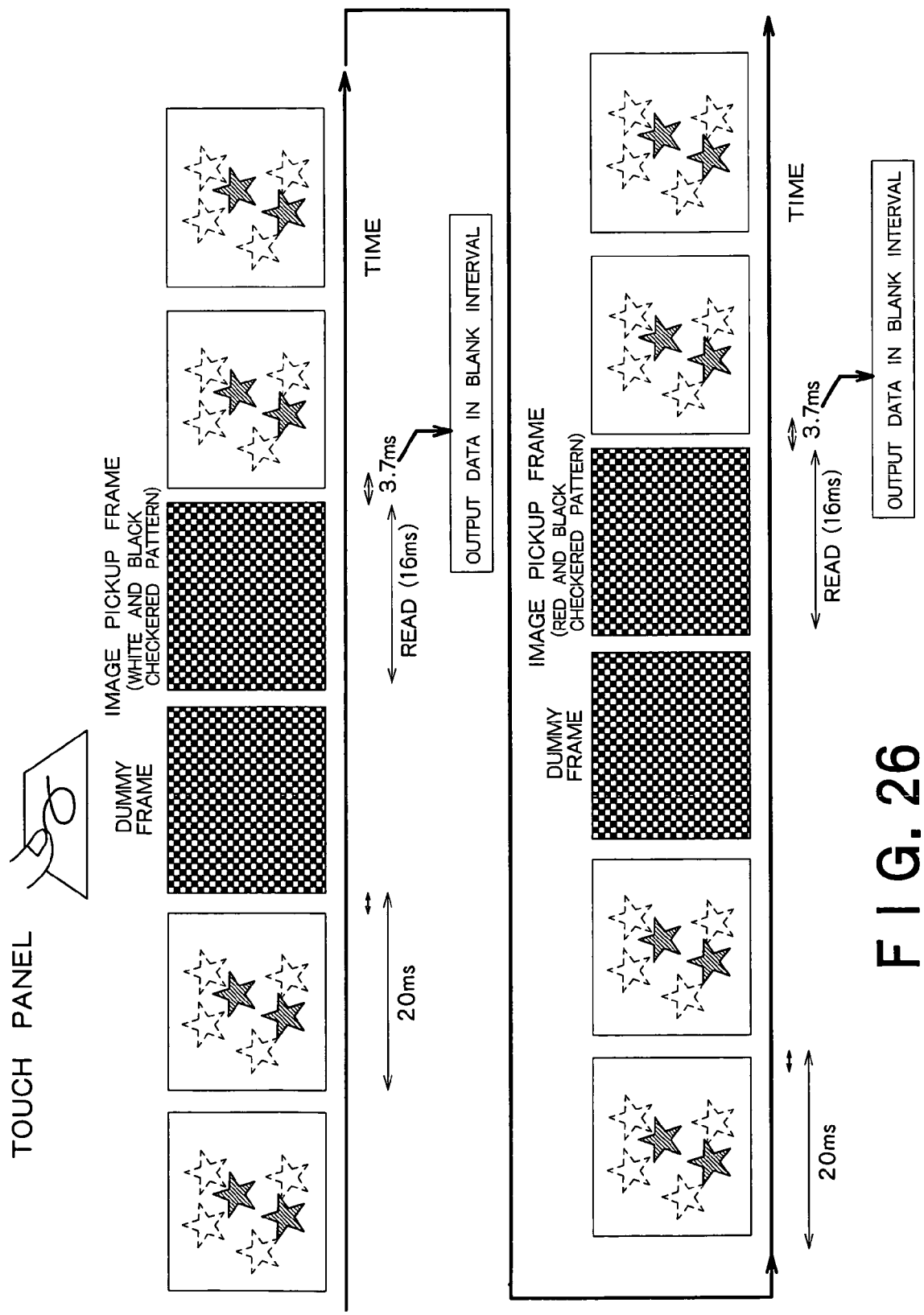
FIG. 26 is a diagram showing an example in which an image of a white and black checkered pattern is picked up, and a red and black checkered pattern is picked up in the next image pickup frame.
Figure 27A:
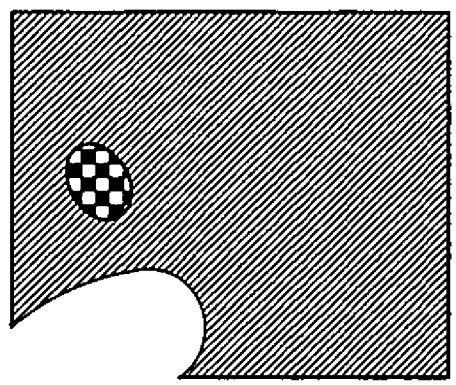
FIGS. 27A and 27B are diagrams showing images picked up by using a pattern shown in FIG. 26.
Figure 27B:
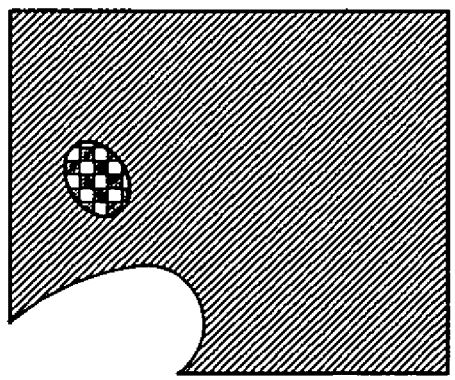

As for the color of the special patterns, a combination other than white and black is also possible. It is possible to, for example, pick up an image using a white and black checkered pattern, and then pick up an image using a black and red checkered pattern in the next image pickup frame as shown in FIG. 26. In a photodiode formed using a low temperature polysilicon process, the sensitivity to red is comparatively low. Therefore, the checkered pattern is clear in a result of image pickup using the white and black checkered pattern as shown in FIG. 27(a), whereas the checkered pattern gets blurred in a result of image pickup using the red and black checkered pattern as shown in FIG. 27(b). On the other hand, the reason why the influence of the external noise light remains unchanged even if the colors of the special patterns are changed is that the array substrate incorporating the sensors 33 as shown in FIG. 4 is disposed on the front side and consequently the signal arriving at the sensors 33 do not change even if the liquid crystal display is changed. By the way, if the array substrate incorporating the sensors 33 is disposed on the rear side (back light side), outdoor daylight passes through the liquid crystal layer before the outdoor daylight arrives at the sensors, and consequently it is subjected to the influence of the display. This results in a disadvantage that discrimination from light reflected by the finger becomes difficult. In this way, in order to realize what a portion of the image pickup result responding to the display condition at the time of image pickup is regarded as the finger and a portion, that does not respond to the display condition is regarded as noise, various variations are possible.

NINTH EMBODIMENT

Figure 28:
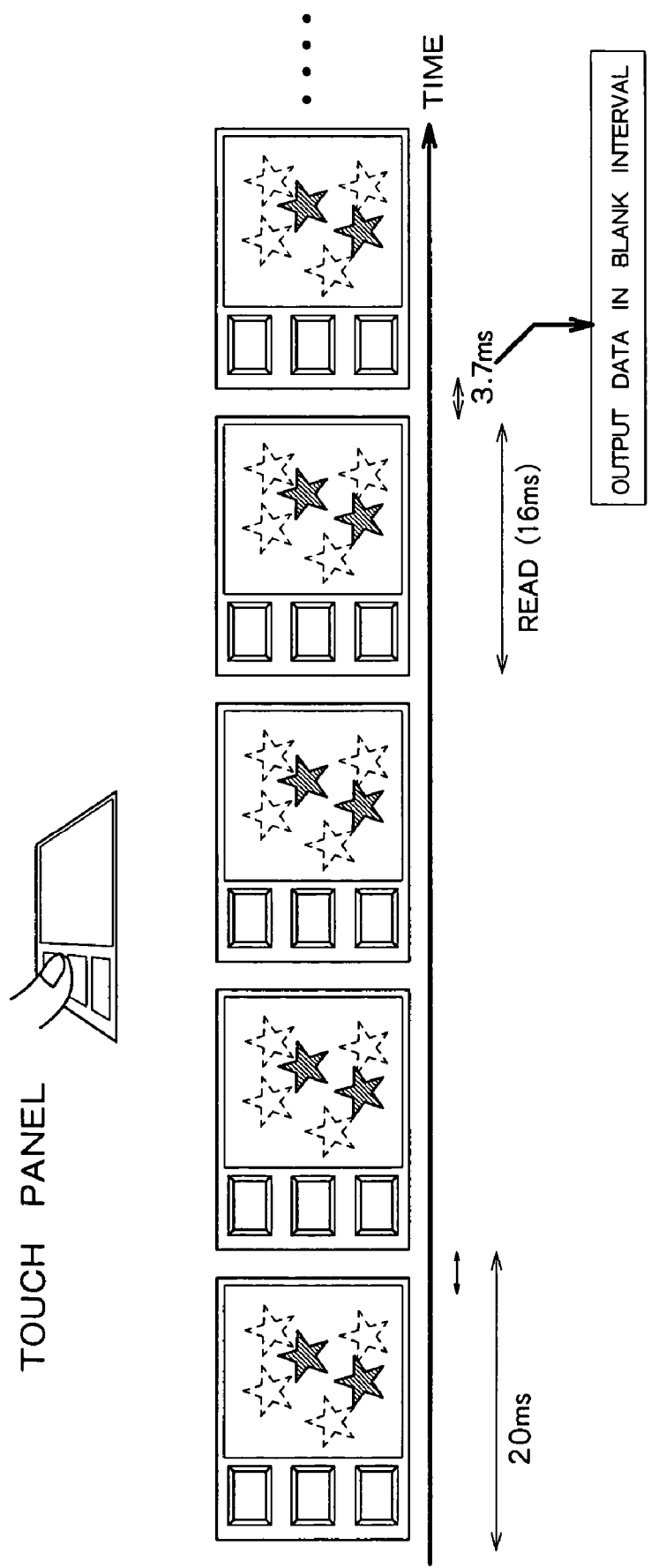
FIG. 28 is a diagram showing an example in which special patterns are displayed only on selection buttons.

In a ninth embodiment, patterns indicating a finger input position (such as selection buttons) are displayed in a part of a display frame as shown in FIG. 28. A portion including the selection buttons becomes the special pattern. In the present example, a checkered pattern is used. By doing so, the controller 6 needs to conduct the analysis of image data only in the display region of the selection buttons, and consequently the speed of the processing can be made higher. Furthermore, the probability of occurrence of false operation due to noise light can be further decreased.

False operation in the present apparatus is caused by (1) noise light having a checkered pattern (2) being incident on a selection button. Because of addition of the requirement (2), the probability of false operation becomes lower than that in the seventh embodiment. Furthermore, unlike the seventh embodiment, it is not necessary to insert a special pattern for image pickup between display frames. Since the operation of the controller becomes comparatively simple, the number of gates in the controller can be reduced and the controller can be made inexpensive.

In the ordinary display in which input using the finger is not accepted, display data is supplied from the controller 6 to the glass substrate at a frame frequency of 50 Hz. At this time, it is not necessary to especially display switches. In a state in which the finger input is accepted, selection buttons are displayed in an arbitrary position of the display frame as shown in FIG. 28. The display region of the selection buttons is provided with a special pattern. In the present example, a checkered pattern is used.

Figure 29:
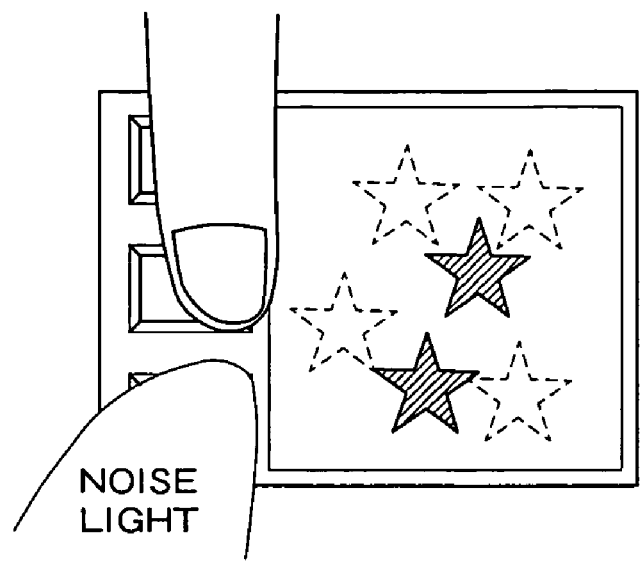
FIG. 29 is a diagram showing an incidence situation of noise light.
Figure 30:
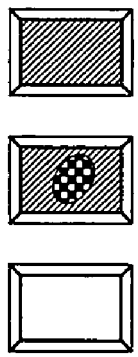
FIG. 30 is a diagram showing a result obtained by picking up an image of selection buttons.

An arbitrary image and three switches are displayed on the display surface as shown in FIG. 29. The three switches are displayed one under another. It is now supposed that a second selection button from the top is selected by the finger and noise light is incident on a third selection button from the top. In FIG. 30, only selection buttons are extracted from a picked-up image. A first switch from the top is black, and consequently it can be judged that the first switch has not been selected. Since the third switch from the top is merely white, it can be judged that the white color has been caused by outdoor daylight noise. Since there is a checkered pattern in the second switch from the top, it can be judged that the second switch has been selected by the finger. In this way, pointing conducted by the finger can be distinguished from noise light.

The special pattern is not restricted to the checkered pattern, but various variations are possible. As for the color of the special pattern as well, various colors are conceivable. It is desirable to combine colors each having a high image pickup contrast ratio taking the spectral characteristics of the sensors and reflection characteristics of the pointing member into consideration. The fineness of the line segments that constitute the pattern is the same as that in the eighth embodiment.

The first to ninth embodiments can be used in combination with a known "means for removing noise from a picked-up image" or "means for retrieving and extracting a special pattern from a picked-up image."

INDUSTRIAL APPLICABILITY

According to the present invention, a position pointed by the hand or the pointing member is detected on the basis of binary data of an image picked up by an image pickup unit and the brightness of the surroundings. Regardless of whether the surroundings are bright or dark, therefore, high precision detection becomes possible.

The invention claimed is:

1. A display apparatus capable of detecting that an arbitrary place of a display screen has been pointed by a human hand or a pointing member, the display apparatus comprising:
   display elements formed near intersections of signal lines and scanning lines respectively arranged in vertical and horizontal directions;
   image pickup units which pick up incident light in a predetermined range;
   D/A conversation circuits provided every a plurality of signal lines to supply pixel data for display to a plurality of signal lines associated therewith;
   amplifier circuits which output the picked-up image data in the image pickup units from pixels by using signal lines that are not supplied with pixel data, while the D/A conversion circuits supply pixel data to signal lines in order; and
   a pointer detection portion which detects a position pointed by a hand or a pointing member on the display screen, on the basis of the picked-up image data,
   wherein whenever the image pickup units perform image pickup, the pointer detection portion detects an image that indicates a pointed position, and when a diameter of the image is maximized, the pointer detection portion judges that the display screen has been pressed strongly by a hand or a pointing member.

2. A display apparatus capable of detecting that an arbitrary place of a display screen has been pointed by a human hand or a pointing member, the display apparatus comprising:
   display elements formed near intersections of signal lines and scanning lines respectively arranged in vertical and horizontal directions;
   image pickup units which pick up incident light in a predetermined range;
   D/A conversation circuits provided every a plurality of signal lines to supply pixel data for display to a plurality of signal lines associated therewith;
   amplifier circuits which output the picked-up image data in the image pickup units from pixels by using signal lines that are not supplied with pixel data, while the D/A conversion circuits supply pixel data to signal lines in order; and a pointer detection portion which detects a position pointed by a hand or a pointing member on the display screen, on the basis of the picked-up image data, wherein the pointer detection portion performs a plurality of product sum computations for successively adding image data of every scanning line, and a division computation conducted using a result of the product sum computations as a numerator or a denominator.

3. The display apparatus according to claim 2, comprising:
a first computation circuit formed on the substrate on which the display elements are formed to conduct the product sum computations; and
a second computation circuit formed on a semiconductor substrate different from the substrate on which the display elements are formed to conduct the division computation.

4. A display apparatus capable of detecting that an arbitrary place of a display screen has been pointed by a human hand or a pointing member, the display apparatus comprising:
display elements formed near intersections of signal lines and scanning lines respectively arranged in vertical and horizontal directions;
image pickup units which pick up incident light in a predetermined range;
D/A conversation circuits provided every a plurality of signal lines to supply pixel data for display to a plurality of signal lines associated therewith;
amplifier circuits which output the picked-up image data in the image pickup units from pixels by using signal lines that are not supplied with pixel data, while the D/A conversion circuits supply pixel data to signal lines in order; and
a pointer detection portion which detects a position pointed by a hand or a pointing member on the display screen, on the basis of the picked-up image data, wherein denoting the number of pixels in a signal line direction of the display screen by X, the number of pixels in a scanning line direction by Y, and the picked-up image data in an arbitrary pixel (x, y) (where $0 \leq x \leq X$ and $0 \leq y \leq Y$) by $L(x, y)$, the pointer detection portion obtains central coordinates (Ex, Ey) of the hand or pointing member using expression (17), and obtains widths (Vx, Vy) of the hand or pointing member in the x direction and y direction using expression (18).

$$Ex = \frac{\sum_{y=0}^{239}\sum_{x=0}^{319} xL(x,y)}{\sum_{y=0}^{239}\sum_{x=0}^{319} L(x,y)} \quad Ey = \frac{\sum_{y=0}^{239}\sum_{x=0}^{319} yL(x,y)}{\sum_{y=0}^{239}\sum_{x=0}^{319} L(x,y)} \quad (17)$$

$$Vx = \frac{\sum_{y=0}^{239}\sum_{x=0}^{319} (x-Ex)^2 L(x,y)}{\sum_{y=0}^{239}\sum_{x=0}^{319} L(x,y)} \quad Vy = \frac{\sum_{y=0}^{239}\sum_{x=0}^{319} (y-Ex)^2 L(x,y)}{\sum_{y=0}^{239}\sum_{x=0}^{319} L(x,y)} \quad (18)$$

5. The display apparatus according to claim 4, wherein the picked-up image data is a picked-up image subjected to image processing.

* * * * *